United States Patent
Wirola et al.

(10) Patent No.: US 10,057,878 B2
(45) Date of Patent: Aug. 21, 2018

(54) LOCATION ESTIMATES

(71) Applicant: HERE GLOBAL B.V., Eindhoven (NL)

(72) Inventors: Lauri Aarne Johannes Wirola, Tampere (FI); Muhammad Irshan Khan, Tampere (FI); Pavel Ivanov, Tampere (FI); Jani Käppi, Ylöjärvi (FI); Jari Tapani Syrjärinne, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/606,176

(22) Filed: May 26, 2017

(65) Prior Publication Data

US 2017/0359796 A1 Dec. 14, 2017

(30) Foreign Application Priority Data

Jun. 10, 2016 (GB) .................................. 1610159.4

(51) Int. Cl.
*H04W 24/00* (2009.01)
*H04W 64/00* (2009.01)
*H04W 4/04* (2009.01)

(52) U.S. Cl.
CPC ........... *H04W 64/006* (2013.01); *H04W 4/04* (2013.01)

(58) Field of Classification Search
CPC .................................................. H04W 64/006
USPC ..................................................... 455/456.1
See application file for complete search history.

(56) References Cited

U.S. PATENT DOCUMENTS

| | | |
|---|---|---|
| 9,179,266 B2 | 11/2015 | Kelly |
| 2013/0162481 A1 | 6/2013 | Parvizi et al. |
| 2013/0166195 A1 | 6/2013 | Bandyopadhyay et al. |
| 2013/0267178 A1 | 10/2013 | Pakzad et al. |
| 2015/0172872 A1 | 6/2015 | Alsehly et al. |
| 2016/0161592 A1 | 6/2016 | Wirola et al. |

FOREIGN PATENT DOCUMENTS

| | | |
|---|---|---|
| KR | 20160071305 | 6/2016 |
| WO | WO-2013/110971 | 8/2013 |
| WO | WO-2014/081699 | 5/2014 |
| WO | WO-2015/082606 | 6/2015 |

OTHER PUBLICATIONS

Wang, Hui et al. "Enhancing the Map Usage for Indoor Location-aware Systems." Retrieved from the Internet: <URL: http://isas.unikarlsruhe.de/Publikationen/HCI07_Wang.pdf>. (undated) 10 pages.

(Continued)

*Primary Examiner* — Joel Ajayi
(74) *Attorney, Agent, or Firm* — Alston & Bird LLP

(57) ABSTRACT

A device obtains at least one characteristic of at least one radio signal detected at a mobile device that is located at a particular site and a representation of a radio environment for the site and a definition of at least one specified path section for the site. The at least one path section has been specified by a person in a map presented on a display. The device determines a location estimate for the mobile device based on the at least one characteristic of the at least one radio signal and based on the representation of the radio environment for the site and adjusts the determined location estimate based on the definition of at least one specified path section.

9 Claims, 11 Drawing Sheets

(56) References Cited

OTHER PUBLICATIONS

Xu, W. "Spatial Model-aided Indoor Tracking." Abstract Only. Retrieved from the Internet: <URL: http://repository.tudelft.nl/view/ir/uuid:8fd6a9ef-3dfb-4bdl-b54e44d5b2cca973/>. (Jun. 27, 2014) 2 pages.
Combined Search and Examination Reports for Great Britain Patent Application No. GB1610159.4 dated Dec. 5, 2016, 6 pages.

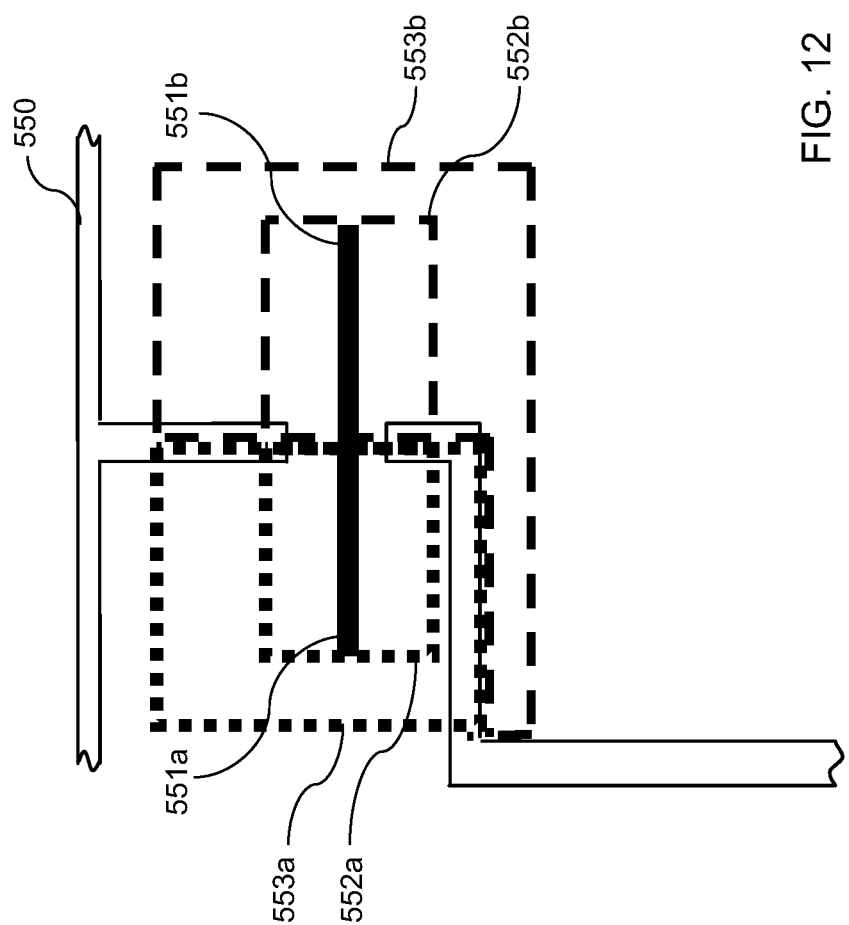

LOCATION ESTIMATES

CROSS-REFERENCE TO RELATED APPLICATIONS

This application claims priority to GB Application No. 1610159.4, filed Jun. 10, 2016, the entire contents of which are incorporated herein by reference.

FIELD OF THE DISCLOSURE

The invention relates to the field of positioning and more specifically to improving location estimates, in particular though not exclusively location estimates that are to be presented on a map, like an indoor map.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BLE) based positioning solutions, cellular network based positioning solutions and wireless local area network (WLAN) based positioning solutions.

A WLAN based positioning solution, for instance, may be divided in two stages, a training stage and a positioning stage.

In the training stage, learning data is collected. The data may be collected in the form of fingerprints that are based on measurements by mobile devices. A fingerprint may contain a location estimate and measurements taken from a radio interface. The location estimate may be for example GNSS based, sensor-based, or manually inputted. Measurements taken from the radio interface may comprise, by way of example, measured radio signal strengths and an identification of WLAN access points transmitting the radio signals. The training may be a continuous background process, in which mobile devices of a large number of consumers are continuously reporting measured data to a server. Consumers may consent to a participation in such a data collection, if their device is equipped with the needed functionality. This approach is also referred to as crowd-sourcing. A crowd-sourcing based training stage may enable an exhaustive survey of a site, for instance all floors, spaces and rooms of a building, in a short time at limited costs. Alternatively or in addition, mobile devices may be used for collecting fingerprints in a systematic manner. Collected fingerprint data may be uploaded to a database in a server or in the cloud, where algorithms may be run to generate radio models of WLAN access points and/or radio maps for positioning purposes.

In the positioning stage, a mobile device may estimate its current location based on own measurements taken from the radio interface and on the data or a subset of data that is available from the training stage. Model data or radio map data that has been generated in the training stage may be transferred to mobile devices by a server via the Internet as assistance data for use in position determinations. Alternatively, model data and/or radio map data may be stored in a positioning server to which the mobile devices may connect to via the Internet for obtaining a position estimate.

A similar approach could be used for a positioning that is based on other types of terrestrial transmitters or on a combination of different types of terrestrial transmitters.

SUMMARY OF SOME EMBODIMENTS OF THE INVENTION

An example embodiment of a method according to the invention comprises obtaining at least one characteristic of at least one radio signal detected at a mobile device that is located at a particular site. The method moreover comprises obtaining a representation of a radio environment for the site and a definition of at least one specified path section for the site, the at least one path section having been specified by a person in a map presented on a display. The method moreover comprises determining a location estimate for the mobile device based on the at least one characteristic of the at least one radio signal and based on the representation of the radio environment for the site. The method moreover comprises adjusting the determined location estimate based on the definition of at least one specified path section. The actions may be performed by a single device or in a distributed manner by two or more devices.

An example embodiment of a first system according to the invention comprises means for causing performance of the actions of any presented embodiment of the example method.

The means of the first system may be implemented in hardware and/or software. They may comprise for instance at least one processor for executing computer program code for realizing the required functions, at least one memory storing the program code, or both. Alternatively, they may comprise for instance circuitry that is designed to realize the required functions, for instance implemented in a chipset or a chip, like an integrated circuit.

An example embodiment of a second system according to the invention comprises at least one processor and at least one memory including computer program code, the at least one memory and the computer program code configured to, with the at least one processor, cause at least one device at least to perform the actions of any embodiment of the presented example method.

Any of the described systems may comprise only the indicated components or one or more additional components. Any of the described systems may comprise one or more devices.

Moreover an example embodiment of a non-transitory computer readable storage medium or a set of non-transitory computer readable storage media, in which computer program code is stored, is presented. The computer program code causes at least one device to perform the actions of any embodiment of the presented example method when executed by at least one processor.

The computer readable storage medium may be for example a disk or a memory or the like. The set of computer readable storage media may be for example a set of memories. The computer program code may be stored in the at least one computer readable storage medium in the form of instructions encoding the at least one computer-readable storage medium. The at least one computer readable storage medium may be intended for taking part in the operation of at least one device, like an internal or external hard disk of a computer, or be intended for distribution of the program code, like an optical disc.

It is to be understood that any embodiment of the computer program code by itself has to be considered an example embodiment of the invention as well. The computer program code could also be distributed to several computer readable storage media.

In certain embodiments, the presented method is an information providing method, and the presented first system is an information providing system. In certain embodiments, the means of the presented first system are processing means.

In certain embodiments, the presented method is a method for improving location estimates. In certain embodiment, any of the presented systems is a system for improving location estimates.

It is to be understood that any feature presented for a particular example embodiment may also be used in combination with any other described example embodiment of any category and any aspect.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 12 is a diagram illustrating a variation of the method of the flow charts of FIGS. 4, 8 and 10.

DETAILED DESCRIPTION OF THE FIGURES

Figure 1:
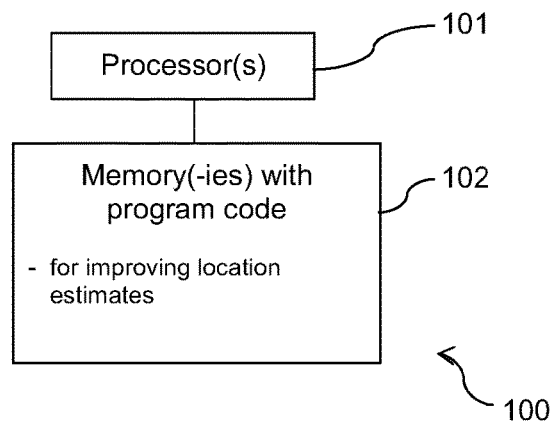
FIG. 1 is a schematic block diagram of an example embodiment of a system.

FIG. 1 is a schematic block diagram of an example embodiment of a system according to the invention. System 100 comprises at least one processor 101 and, linked to the at least one processor 101, at least one memory 102. The at least one memory 102 stores computer program code for improving location estimates. The computer program code may be distributed to a plurality of memories 102. The computer program code may be example computer program code according to the invention, and the at least one memory 102 may be an example computer readable medium or an example set of computer readable media according to the invention. The at least one processor 101 is configured to execute computer program code stored in the at least one memory 102 in order to cause at least one device to perform desired actions. If two or more processors 101 are configured to execute computer program code stored in two or more memories 102 in order to cause two or more devices to perform desired actions, the two or more devices may be caused to perform the actions in a complementary manner.

System 100 may be a device or comprise at least two interacting devices. System 100 may be for instance a mobile device, like a mobile communication device, or a stationary device, like a server, or a combination of a server and a mobile device, or a combination of two mobile devices, or a combination of a mobile device and another user device, like a personal computer (PC) or a work station. A mobile device is configured to enable operations while the device is moving. A stationary device is configured to be stationary when in operation and/or fixed to a particular location. A stationary device may be ground based and thus stationary with respect to Earth or only stationary within a particular environment, like a ship. System 100 may equally be or comprise at least one module, like a chip, circuitry on a chip or a plug-in board, for at least one device. Optionally, system 100 may comprise various other components, like a user interface, a data interface, a further memory, a further processor, etc.

An example operation of system 100 will now be described with reference to the flow chart of FIG. 2. The operation is an example embodiment of a method according to the invention. Processor(s) 101 and the program code stored in memory(-ies) 102 cause at least one device to perform the operation when program code is retrieved from memory(-ies) 102 and executed by processor(s) 101. The at least one device that is caused to perform the operation may for instance correspond to system 100, comprise system 100 or be comprised by system 100.

The at least one device obtains at least one characteristic of at least one radio signal detected at a mobile device that is located at a particular site. (action 201) The site may be an indoor site, but it may equally be an outdoor site or comprise outdoor areas. The at least one device performing the action may but does not have to correspond to the mobile device.

The at least one device furthermore obtains a representation of a radio environment for the site and a definition of at least one specified path section for the site, the at least one path section having been specified by a person in a map presented on a display. (action 202) A representation of a radio environment may be any kind of data that allows determining characteristics of radio signals that may be expected to be observed at different geographic locations of a site. The definition of the at least one specified path section may be of any kind that allows linking the path section directly or indirectly to a corresponding section at the site. If the path section has the form of a straight line, it may be defined for instance by a start point and an end point of the line; if it is a polygon chain, it may be defined for instance by a start point, one or more intermediate points and an end point. Each start, end or intermediate point may be defined by a coordinate value of a geographical location at the site corresponding to the point in the map. The coordinate values may be for instance longitude and latitude values, or coordinate values of a coordinate system defined specifically for the site. Alternatively, a path section may be defined for instance in terms of adjacent grid points of a virtual grid covering the site. It is to be understood that a specified path section does not have to be limited to a line or a polygon chain. The person having specified the at least one path section will generally, though not necessarily, be another person than the user of the at least one device or the user of the mobile device. In some embodiments, the definition of the at least one specified path section may be integrated as a part of the representation of the radio environment for a site and thus be obtained along with the representation of the radio environment.

The at least one device furthermore determines a location estimate for the mobile device based on the at least one characteristic of the at least one radio signal and based on the representation of the radio environment for the site. (action 203)

The at least one device furthermore adjusts the determined location estimate based on the definition of at least one specified path section. (action 204)

In open spaces indoors, a pedestrian may generally move freely. In a hall, for example, every path across the hall may be taken. However, when it comes to crossing indoor boundaries, for instance when going from one space to another, there may be a single allowed path via, for instance, a door. When determining location estimates for a mobile device of a user while the user moves between spaces, the location estimates may indicate a movement from one space to another across a wall, in case no special measures are taken. This may result in adverse user experience, when the user sees this taking place on an indoor map on which the location estimates are visualized. In practice it has proven difficult to automate the process of extracting a graph required for movement restriction from an indoor map, for instance a floor plan. Also, it is difficult to detect, in which parts of the indoor space the restricting graph should be used and in which not. To exemplify, a movement restricting graph may be used in a corridor and from there to rooms. However, such a graph may rather not be useful in a hall or atrium, because there people can wander freely. Automating such differentiation is notoriously difficult.

Certain embodiments of the invention therefore provide that at first, a location estimate for a mobile device is determined based on radio signals received at the mobile device and a representation of a radio environment that is available for the site at which the mobile device is known to be located. Then, the location estimate may be adjusted, if appropriate. One or more path sections are specified for the site as a basis for such adjustments. The path sections may have been specified manually in a map that is presented on a display, since a person may intuitively know where it is possible to move around freely and where a movement is not possible due to obstacles or not allowed.

A path section may be for instance a section that is assumed by the person specifying the path section to have the highest likelihood to contain a representation of a geographical location that is close to a true location of a mobile device in the case a location estimate for the mobile device is determined to lie in the immediate surrounding of the path section. Path sections may be defined for any location at which some kind of guidance of location estimates is considered to be of potential use. It is possible, for example, to specify path sections passing through doors, including entrances to and exits from a building, or other narrow passages between spaces. By specifying a path section that passes through a narrow passage, location estimates may be adjusted to approach the defined path section such that they are guided to move through the passage, rather than through adjacent walls. It is also possible, for example, to specify path sections turning around corridor corners, since otherwise a presented sequence of location estimates may occasionally "cut the corner". Such a cutting of corners may take place more often in an environment with a low number of beacons or an uneven distribution of beacons transmitting the radio signals. By specifying a path section that turns around a corner, location estimates may be adjusted to approach the specified path section such that they rather do not cut the corner. It is also possible, for example, to specify path sections running along long narrow corridors. Such corridors are highly susceptible for a sequence of location estimates sheering into nearby rooms etc. By specifying a path section along a narrow corridor, the location estimates may be adjusted to follow the corridor more smoothly.

Certain embodiments of the invention may thus have the effect that they improve the performance of location estimation for a mobile device at key locations, for instance when moving from indoors to outdoors or vice versa.

Figure 2:
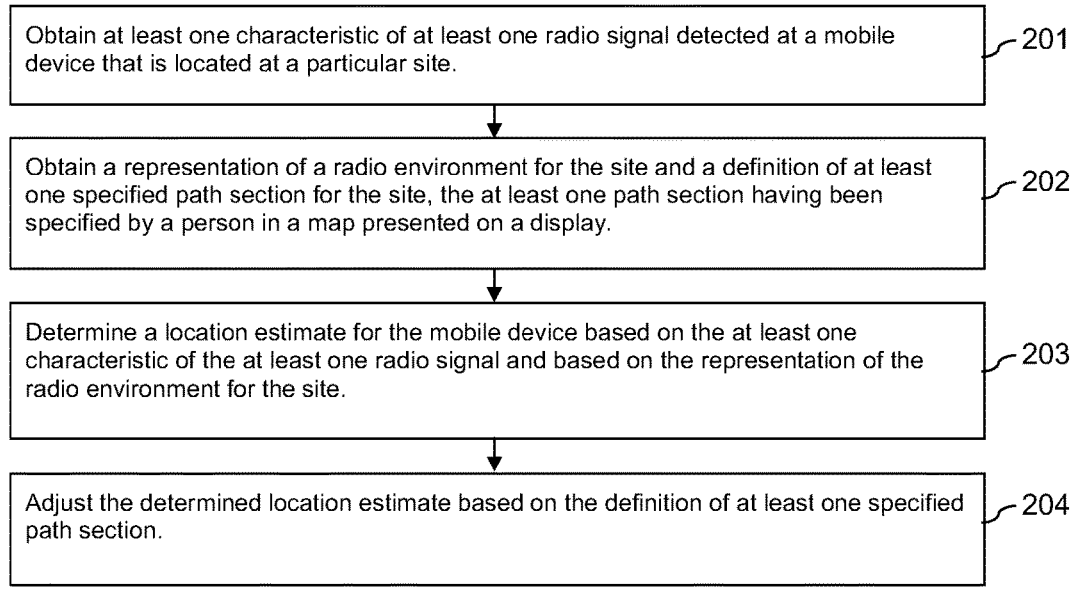
FIG. 2 is a flow chart illustrating an example embodiment of a method.

System 100 illustrated in FIG. 1 and the method illustrated in FIG. 2 may be implemented and refined in various ways.

In example embodiments, a map of the site is presented on a display and the adjusted location estimate is indicated in the map. The display may be the display of the mobile device, for which the location is estimated, or the display of another device. Furthermore, the display may be a display of the device determining and adjusting the location estimate, or a display of another device. If the site is or comprises a building, the presented map may be for instance a floor plan. Furthermore, the presented map may be for instance a two-dimensional floor plan of the site or a three-dimensional plan of a floor or of a building.

Due to the adjustment of the location estimate, the user experience with location estimates presented in a map on a display may be improved, as the presentation of location estimates indicating movements through walls or across other obstacles may be reduced significantly by the adjustment of originally determined location estimates.

In example embodiments, adjusting the determined location estimate based on the definition of at least one specified path section comprises selecting one of the at least one specified path section that meets at least one predetermined criterion, and adjusting the determined location estimate based on the definition of the selected specified path section. This may have the effect that only a specified path section that may be relevant for a current location estimate forms the basis of an adjustment of the location estimate.

In example embodiments, selecting one of the at least one specified path section that meets at least one predetermined criterion comprises selecting a specified path section that is closest to the determined location estimate, or selecting a specified path section with which an influence area is associated, in which the determined location estimate is determined to lie. The latter option also provides evidence that the location estimate is close to the selected specified path section. If the determined location estimate is assumed to have a certain accuracy, it may also be assumed that only close specified path sections may be relevant for an adjustment.

In example embodiments, the specified path section is only selected in case it meets at least one further predetermined criterion. That is, a close path section is only considered further, in case it meets some other criterion in addition. This may have the effect that it is possible to further differentiate between path sections that may potentially be relevant based on any available information that may be suitable for such a differentiation.

Example embodiments further comprise for instance determining a direction of movement of the mobile device. The at least one further predetermined criterion may then require that the definition of a specified path section comprises an indication that the path section has no directionality or a directionality corresponding to the determined direction of movement. This has the effect that only path sections may be considered for the adjustment of the location estimate that are compatible with the direction of movement of the mobile device. Such an indication of directionality may be included in the definition of a specified path section for instance in case a door is an entrance-only or an exit-only door. For instance, in case a door may only be passed in one direction and a path section through this door has been specified and associated with an indication of this direction, but the determined movement of the device is in the opposite direction, it is unlikely that the user of the mobile device is about to pass through this door.

Movement information for a mobile device may be derived for instance from a sequence of at least two location estimates. Instead of movement information, it is also possible to use heading information of the mobile device.

If movement information is not available, the directionality of a path section may exploited for taking the location estimate to the right direction, when it has been detected that the user is on the path section.

It is to be understood that the definition of a specified path section may include other indications that may form the basis for other criteria, which may be considered alternatively or in addition. A further indication may be for example an indication of an existence of steps on the specified path section. This may have the effect that a direction of movement including e.g. a change in height of determined location estimates may be taken into account when checking whether any specified path section should be considered for adjusting location estimates. This may have the effect that location estimates can be adjusted to move smoothly according to the steps along the special path.

In general, it has to be noted that a path section may also be specified such that it comprise a vertical dimension.

It has to be noted that the definition of a path section may comprise further information that may not be exploited for the selection of a path section but only after a path section has been selected, e.g. for presentation to a user. For example, a definition of a path section with assigned direction may be supplemented with information that the path section goes from indoor to outdoor, or in general from any first certain area to any second certain area. This would enable, for instance, not only a presentation of location estimates—partly adjusted—to a user, but in addition or alternatively e.g. an audio output providing corresponding information to a user.

In example embodiments, the definition of the at least one specified path section comprises an indication of one of at least two types of path sections. Adjusting the determined location estimate based on the definition of the selected specified path section may then comprise determining and taking account of the type of the selected specified path section. This may have the effect that different structural situations may be handled differently. It is to be understood that the aspect of differentiating between two or more types of specified path sections is also to be considered an invention on its own, irrespective of how the path section are specified.

In example embodiments, a type of a path section is one of a restricting type or a pulling type or a guiding type (or optionally any further type). In case a selected path section is of a restricting type, adjusting a determined location estimate may comprise adjusting the determined location estimate to lie within a target area associated with the selected path section, at least if the determined location estimate is close to the selected path section. In case a selected path section is of a pulling type, areas closer to the selected path section may be given a higher weight than other areas when adjusting a location estimate, at least if the determined location estimate is close to the selected path section. Depending on the structural situation, the pulling type may cause the location estimate to be gently pulled towards the specified path section, while the restricting type may cause a snapping of the location estimate into a subspace comprising the path section. The restricting type may be used for instance for doors or other narrow passages connecting two spaces. The pulling type may be used for instance for long narrow corridors, or at corridor corners, where there is more freedom to the movements of a user. In case a selected path section is of a guiding type, adjusting a determined location estimate is based on an evaluation of a sequence of at least two determined location estimates. This may have the effect that a confirmation may be obtained that the specified path section has actually been traversed before a location estimate is adjusted.

It is to be understood that a restricting type, a pulling type and a guiding type may be supported in any combination in certain embodiments.

It is to be understood that one of the supported types of path sections may be a default type. That is, if a definition of a path section is enabled to differentiate between types, but no type is indicated, the path section may be assumed to be of the default type.

It is to be understood that a differentiation between different types of path sections is not essential. If there is no differentiation, the definition of a specified path section does not have to include any indication of the type. The kind of adjustment may then be the same for all path sections.

An adjustment of a location estimate may be realized in many different ways. It may comprise for instance a shift of the determined location estimate to a new location, and a shifted location estimate may then be used for instance alternatively or in addition to the determined location estimate.

In example embodiments, adjusting a determined location estimate comprises shifting a location estimate, which lies within an influence area associated with the selected path section, to the closest point on the selected path section. In a variation, adjusting a determined location estimate comprises shifting a location estimate, which lies within an influence area associated with the selected path section, to a closest point in a target area associated with the selected path section.

Alternatively, adjusting a determined location estimate comprises shifting the determined location estimate in direction of the selected path section, wherein a relative distance by which the determined location estimate is shifted is selected to be the larger the closer the determined location estimate is to the selected path section. Optionally, such an adjustment may take place only, in case the determined location estimate lies within a predetermined distance to the selected path section.

Further alternatively, adjusting a determined location estimate comprises, with the determined location estimate being a first location estimate that is determined based on a representation of a radio environment for the entire site, determining a second location estimate based on a representation of a radio environment for a sub-space comprising the selected path section, and choosing the second location estimate as adjusted location estimate in case the first location estimate and the second location estimate lie within a predetermined distance to each other.

Further alternatively, adjusting a determined location estimate comprises, with the determined location estimate being a first location estimate that is determined based on a representation of a radio environment for the entire site, determining a second location estimate based on a representation of a radio environment for a sub-space comprising the selected path section, and choosing the second location estimate as adjusted location estimate in case the first location estimate lies within a predetermined distance to the sub-space.

Further alternatively, adjusting a determined location estimate comprises, with the determined location estimate being a first location estimate that is determined based on a representation of a radio environment for the entire site, and in case the first location estimate lies within a predetermined influence area, determining a second location estimate based on a representation of a radio environment for a sub-space comprising the selected path section, and choosing the second location estimate as adjusted location estimate.

Further alternatively, adjusting a determined location estimate comprises, with the determined location estimate being a first location estimate that is determined based on a representation of a radio environment for the entire site, determining a distance of the first location estimate to a closest point of the selected path section, and in the case the distance falls short of a predetermined value, determining a second location estimate based on a representation of a radio environment for a sub-space comprising the selected path section, and choosing the second location estimate as adjusted location estimate.

Representations of a radio environment for a sub-spaces comprising a respective path section may be defined and stored in advance and be obtained e.g. along with the representation of a radio environment for the site. Alternatively, a representation of a radio environment for a sub-space comprising the selected path section may be determined when needed, for instance based on the obtained representation of a radio environment for the site.

For the above four example alternatives, the first location estimate and the second location estimate are determined for the same point in time.

Further alternatively, adjusting a determined location estimate comprises, with the determined location estimate being a first location estimate that is determined based on at least one characteristic of the at least one radio signal detected at the mobile device at a first instance of time, determining a second location estimate based on at least one characteristic of the at least one radio signal detected at the mobile device at a second instance of time, and supplementing the first location estimate and the second location estimate with intermediate location estimates, the intermediate location estimates being determined such that a route from the first location estimate to the second location estimate via the intermediate location estimates passes at least one target area associated with the selected path section.

Further alternatively, adjusting a determined location estimate comprises, with the determined location estimate being a first location estimate that is determined based on at least one characteristic of the at least one radio signal detected at the mobile device at a first instance of time, determining a second location estimate based on at least one characteristic of the at least one radio signal detected at the mobile device at a second instance of time, and supplementing the first location estimate and the second location estimate with intermediate location estimates, in case the first location estimate lies in a first influence area associated with the selected path section and the second location estimate lies in a second influence area associated with the selected path section or with a further selected path section. In this approach, the adjustment may be based on evidence that the selected path section has actually been traversed, e.g. if the location estimates determined for the first and second time instance lie in influence areas on different sides of a wall that is connected by a door through which a selected path section or a combination of selected path sections passes. The intermediate location estimates may then ensure that an indicated connection between the first and second location estimate passes via the intermediate location estimates and thus via the door.

A supplementary intermediate location estimate may be considered to constitute an adjusted location estimate, which may be determined in the same manner based on an originally determined location estimate as presented for adjusted location estimates that may replace an original location estimate.

If the adjusted location estimates are presented on a display, in the latter two alternatives, the second location estimate may be presented only after the intermediate location estimates have been presented.

A system may support only one of these alternatives of adjusting a determined location estimate or at least two. It may also support further alternative or additional approaches for adjusting a determined location estimate.

Definitions of areas that are associated with path sections may be obtained as a part of the definition of at least one specified path section, for instance based on an input of the person who specified the path sections, or such areas may be determined based on predefined rules, e.g. as a rectangles of predetermined width and of a length that is equal or proportional to the length of the path section. Such areas associated with a path section may be of different kinds, depending for example on the type of path section. An influence area may be associated with a path section, which indicates a desired possible influence of the path section on all location estimates within this influence area. Another area may be associated with a path section, which indicates a target area for adjusted location estimates. Such a target area, if defined, may be contained for instance in an influence area. The influence area as well as the target area may at least partially contain the specified path section with which they are associated. In the simplest case, any area may be defined by a stripe of certain width centered along the specified path, i.e. an area may be a rectangle centered along the path and having certain width. Alternatively, the outlines of an area may be defined, which may also support more complex shapes than rectangles. In example embodiments, it may also be possible that two or more areas of the same kind are associated with a single path section, in particular with different parts of the path section.

In example embodiments, the obtained at least one characteristic of a radio signal comprises an indication of a received signal strength of the radio signal. Using received signal strength related values as a characteristic of radio signals may have the effect that such values may be determined for transmissions of any kind of beacon. It may further have the effect that they may be measured at a receiving end without establishing any connection with the transmitting end. An indication of a received signal strength of a radio signal may be for instance a received signal strength indication (RSSI) or a physical Rx level in dBm with a reference value of 1 mW, etc. Another kind of indication of a received signal strength of a radio signal may be for instance an indication of a path loss of a radio signal at a particular location. Other possible characteristics may comprise a timing advance (TA) value or a round-trip time value.

A representation of a radio environment may be for instance a grid based radio map indicating for each grid point characteristics of radio signals that may be expected to be observed from identified beacons at a geographic location corresponding to the grid point. Using grid based radio maps as representations of the radio environment may have the effect that the data may reflect details of the real radio environment particularly well.

Alternatively, a representation of a radio environment may comprise for instance parameter values of a set of parametric radio models for radio signals transmitted by beacons at the localization site. Using parameter values of parametric radio models may have the effect that the required amount of data for defining the radio environment of a site may be particularly small. The radio models may model any characteristic of radio signals transmitted by a beacon at various locations. An example of a parametric radio model is a path loss model for radio signals transmitted by a beacon. In this case, the parameters may comprise an identification of the beacon, a location of the beacon, a path loss exponent and an indication of a transmission power used by the beacon.

The beacons transmitting the radio signals that are reflected in the representation of the radio environment of a site may comprise any kind of terrestrial transmitter, in particular, though not exclusively, any kind of non-cellular terrestrial transmitter. In example embodiments, the beacons comprise a wireless local area network access point and/or a Bluetooth beacon and/or a Bluetooth beacon enabling Bluetooth low energy mode and/or a Bluetooth low energy beacon. It is to be understood that in some embodiments, characteristics of radio signals from different types of beacons on the site may be considered.

WLAN access points and Bluetooth beacons are already installed in many buildings. Furthermore, WLAN and Bluetooth technologies are supported by many mobile user devices by default, like by most smartphones, tablets, laptops and feature phones. Using characteristics of signals transmitted by WLAN access points, Bluetooth beacons and/or BLE beacons may thus have the effect that the supported positioning may be based in some embodiments on an existing infrastructure in buildings and/or on existing capabilities in many mobile devices. As a result, the approach may be globally scalable and have low maintenance and deployment costs. The deployment of new infrastructure, including for example beacons and tags, is possible but not necessary. In addition, the end-user experience may be acceptable with these technologies, since a horizontal positioning accuracy of 2-3 meters as well as close to 100% reliability in floor detection may be achieved. The beacons may be stand-alone devices or be integrated into or attached to some other device. The use of Bluetooth low energy may enable a positioning with limited energy consumption at all involved devices. A Bluetooth beacon that is employed for the invention may be any kind of Bluetooth beacon complying with any present or future standard.

It is to be understood, however, that other types of beacons than variations of WLAN access points or Bluetooth beacons may be considered as well, for instance tags or other devices that are configured to transmit ultra-wideband (UWB) signals or ultra-sound signals or any wireless signals that might emerge in the future.

If the considered beacons comprise alternatively or in addition a cellular transmitter, the beacons may comprise for instance a base station of a Global System for Mobile Communications (GSM) network, of a CDMA2000 network, of a Universal Mobile Telecommunications System (UMTS) network, of a long term evolution (LTE) network, or of any other current or future kind of cellular network.

Figure 3:
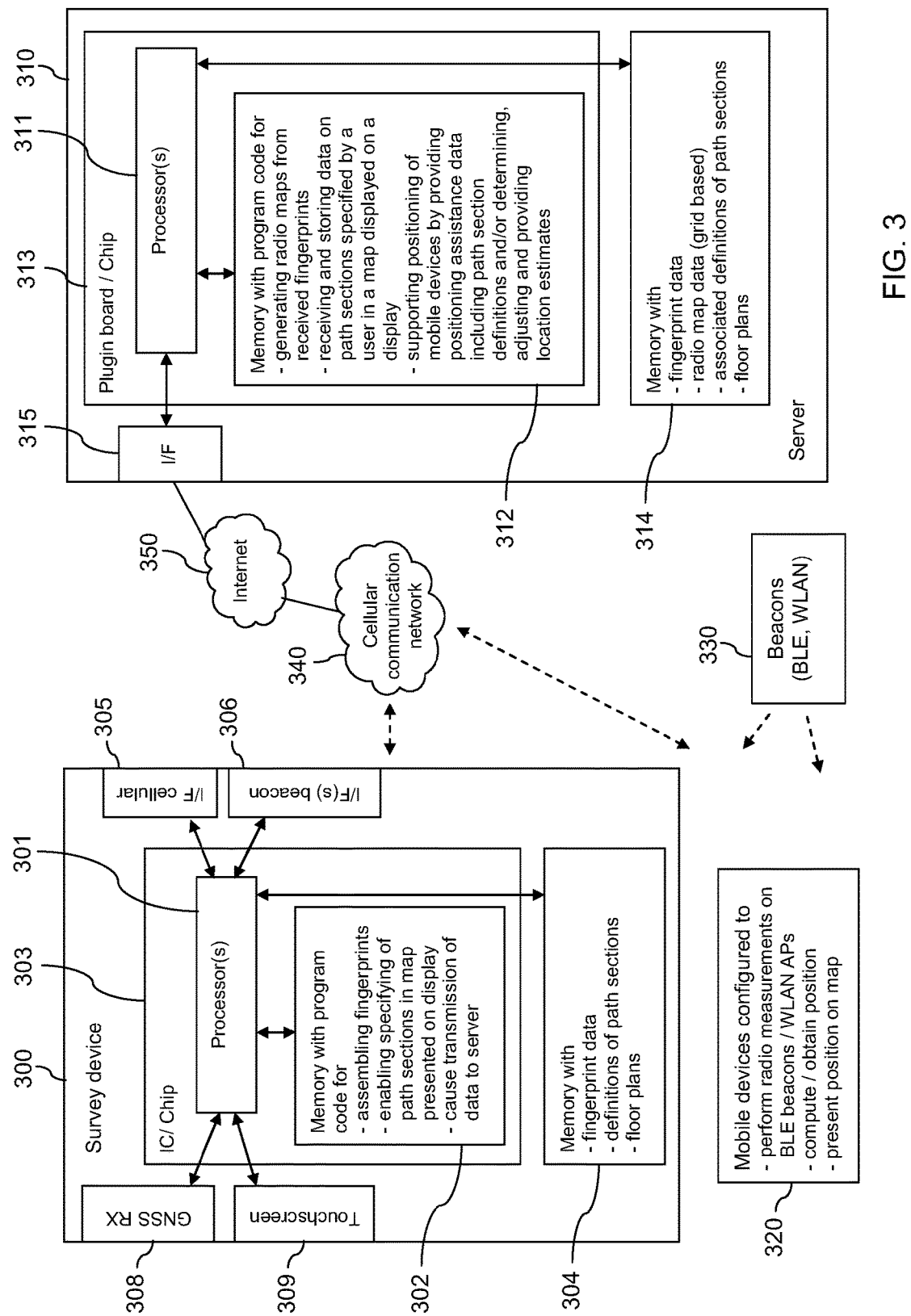
FIG. 3 is a schematic block diagram of a further example embodiment of a system.

FIG. 3 is a schematic block diagram of an example embodiment of a system supporting an improvement of a user experience with location estimates presented on a map.

The system comprises at least one mobile survey device 300, a server 310, at least one mobile user device 320 that may need to know its own position, and a plurality of beacons 330.

Mobile survey device 300 may be for instance a regular mobile terminal, like a smartphone or general purpose tablet PC, or a dedicated survey device.

Mobile survey device 300 comprises a processor 301 that is linked to a first memory 302, to a second memory 304, and to an interface 305 for cellular communication, to at least one interface 306 for receiving signals from beacons 330, a GNSS receiver 308 and a touchscreen 309.

Processor 301 is configured to execute computer program code, including computer program code stored in memory 302, in order to cause mobile survey device 300 to perform desired actions. It is to be understood that processor 301 may comprise or have access to a working memory for this purpose, for example in the form of a random access memory (not shown).

Memory 302 stores computer program code for assembling fingerprints, computer program code for presenting a map on touchscreen 309 and for enabling a specification of path sections in the map, and computer program code for causing a transmission of data to server 310. In addition, memory 302 may store computer program code configured to realize other functions. Memory 302 may also store for instance an operating system for mobile survey device 300. In addition, memory 302 may store any kind of data.

Processor 301 and memory 302 may optionally belong to a module 303, like a chip or an integrated circuit or any other kind of processing circuitry, which may comprise in addition various other components, for instance a further processor or a further memory.

Memory 304 is configured to store data, including for example fingerprint data, definitions of path sections and floor plans as example map data. In addition, memory 304 may also store any kind of data.

Interface 305 is configured to enable communications with other devices via a cellular communication network 340 and further, for example, via the Internet 350. It may be or belong to a cellular engine.

The at least one interface 306 is configured to detect signals from one or more kinds of beacons 330, for instance BLE beacons and/or WLAN access points, and optionally to enable a communication via one or more kinds of beacons 330.

GNSS receiver 308 may comprise any kind of global navigation satellite signal receiver, for example a GPS receiver and/or a GLONASS receiver and/or a GALILEO receiver. It may be configured to receive corresponding satellite signals and to determine the current position of mobile survey device 300 based on the signals, possibly using assistance data. Such assistance data may be received for instance from a server via the Internet 350 and cellular communication network 340.

Touchscreen 309, as an example display, enables a visual presentation of data to a user. In addition, it enables the input of a user via the display. It is to be understood that in addition to touchscreen 309, mobile survey device 300 may comprise various other user interface components, like buttons, keys, a microphone, a loudspeaker, etc.

Mobile survey device 300 may comprise further components not shown.

Server 310 may be for instance a dedicated location server or a general purpose server. It may be provided for supporting a positioning of mobile devices at a particular localization site or for supporting a positioning at a plurality of localization sites. Server 310 comprises a processor 311 that is linked to a first memory 312, to a second memory 314, and to an interface 315.

Processor 311 is configured to execute computer program code, including computer program code stored in memory 312, in order to cause server 310 to perform desired actions. It is to be understood that processor 311 may comprise or have access to a working memory for this purpose, for example in the form of a random access memory (not shown).

Memory 312 stores computer program code for generating radio maps from received fingerprints, computer program code for receiving and storing data on path sections specified by a user in a map presented on a display and computer program code for supporting a positioning of mobile devices by providing assistance data and/or by determining and providing location estimates. All of this computer program code may belong for instance to a radio map generation application. In addition, memory 312 may store computer program code configured to realize various other functions. Memory 312 may also store for instance an operating system for server 310. In addition, memory 312 may store any kind of data.

Processor 311 and memory 312 may optionally belong to a module 313, like a plug-in board or a chip or an integrated circuit or any other kind of processing circuitry, which may comprise in addition various other components, for instance a further processor or a further memory.

Memory 314 is configured to store data, including for example floor plans for at least one site, received fingerprint data, grid based radio map data and associated definitions of path sections. In addition, memory 314 may also store any kind of data. It is to be understood that memory 314 could also be external to server 310.

Interface 315 is configured to enable a communication with other devices, for instance via the Internet 350.

It is to be understood that server 310 may comprise various other components, like a user interface.

Component 303 with component 313 or mobile survey device 300 with server 300 may also be an example embodiment of a system of the invention.

Mobile user device 320 may be for instance a regular mobile terminal, like a smartphone or general purpose tablet PC, or it may be for instance an Internet of Things (IoT) device, like a smart watch or a smart band, etc. It is configured to perform measurements on signals transmitted by at least one type of beacons 330, and to access the Internet 350, for instance via a cellular communication network 340 or a WLAN, in order to communicate with server 310. It is further configured to compute its own position or to obtain a computed location estimate from server 310 upon request.

The beacons 330 may be for instance WLAN access points and/or BLE beacons. They are distributed at a localization site, by way of example in a large building like a shopping mall, such that at least one beacon may be observed at essentially each location of the localization site at which a positioning of mobile user devices 320 is to be supported.

Cellular communication network 340 may be of any type; it may be for instance, though not exclusively, a GPRS, UMTS or LTE network.

Figure 4:
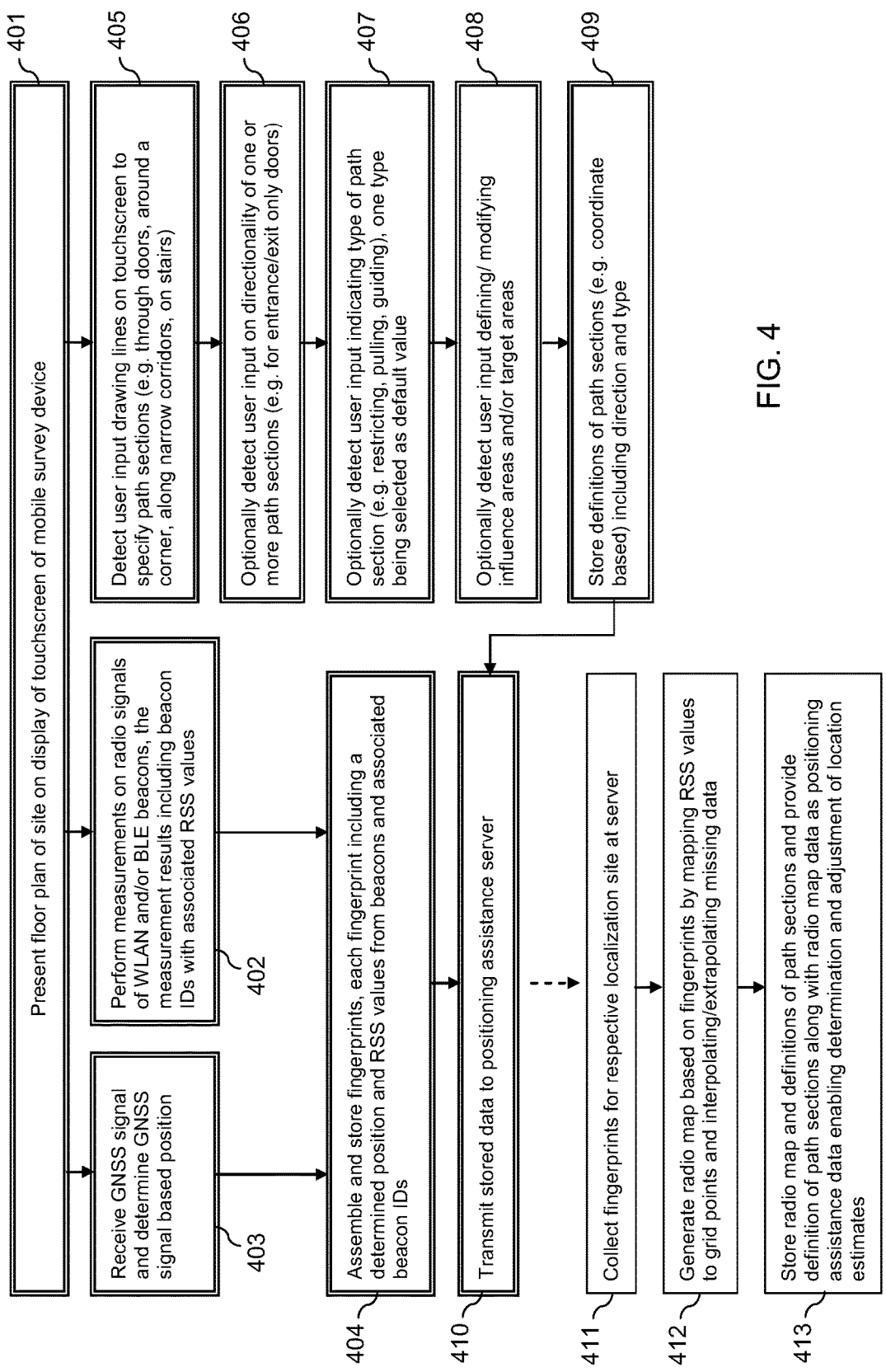
FIG. 4 is a flow chart illustrating a first example embodiment of a method in the system of FIG. 3.

FIG. 4 is a flow chart illustrating first example operations of mobile survey device 300 and server 310 in the system of FIG. 3. Processor 301 and some of the program code stored in memory 302 may cause mobile survey device 300 to perform the actions presented with double lines when the program code is retrieved from memory 302 and executed by processor 301. Processor 311 and some of the program code stored in memory 312 may cause server 310 to perform the actions presented with single lines when the program code is retrieved from memory 312 and executed by processor 311. The purpose of the operations of FIG. 4 is to generate enhanced positioning assistance data for a localization site. Mobile survey device 300 and sever 310 may perform corresponding actions separately for each of a plurality of localization sites. It is to be understood that, in particular for different sites, server 310 may also interact with different mobile survey devices 300 to this end. It is further to be understood that if server 310 is provided for a single site, mobile survey device 300 may also interact in a similar manner with different servers 310 for different sites.

A user of mobile survey device 300 has activated an application for collecting data as a basis for positioning assistance data for a particular localization site, for instance a particular building.

Mobile survey device 300 presents a floor plan on touchscreen 309 to assist the user in the collection of data. (action 401) The required data may be retrieved from memory 304. The data for floor plans for all floors of the particular building or for several buildings may have been received for example from server 310 and stored in memory 304. The particular building may be identified by a user input, and the floor plan that is presented may be based on a user input with respect to the floor on which the user is currently located. Alternatively, building and/or floor may be determined automatically based on position and altitude determined by GNSS receiver 308 of mobile survey device 300.

While mobile survey device 300 moves around at the localization site, it scans for radio signals from beacons 330 in its environment at regular intervals. Whenever device 300 detects at least one radio signal during a scan, it measures the received signal strength (RSS) of each radio signal and extracts an identifier of the transmitting beacon, e.g. a medium access control (MAC) address of a transmitting BLE beacon or WLAN access point, from the radio signal. The measured radio signal strength values may then be considered to be characteristics of the observed radio signals. (action 402)

In addition, mobile survey device 300 obtains an indication of its current position at each location at which measurements are performed during a scan. To this end, GNSS receiver 308 may capture satellite signals and estimate the position of mobile survey device 300 at the same regular intervals in which scans for radio signals are performed, for example once per second. (action 403) Since satellite signals may be difficult to receive within buildings, such a positioning may be an assisted GNSS (AGNSS) based positioning using available assistance data. The assistance data may be provided for example by some GNSS assistance server via cellular communication network 340. The indicated position obtained by mobile survey device 300 may have a horizontal component, for instance a longitude value and a latitude value, or easting and northing values. In addition, it may comprise an indication of the floor on which the user is located. The indication of the floor may be obtained for instance from a general input by the user when reaching a new floor. Alternatively, the position estimated by GNSS receiver 308 may include an altitude component, and the altitude may be mapped to a respective floor based on a reference altitude of the ground floor and some general or building specific information on the height of floors. It is to be understood that alternatively or in addition, other means may be used for determining the locations of measurements. For example, the user of device 300 may be required to enter information on a respective measurement location, for instance based on a grid covering the floor plan presented on touchscreen 309.

The RSS values and the associated beacon IDs obtained during a scan as well as the indication of the location of measurement obtained essentially at the same point in time are assembled as a fingerprint and stored in memory 304 until the survey of the localization site has been completed for the time being. (action 404)

In parallel, the user of mobile survey device 300 considers whether any of the areas he/she passes may benefit from a restriction/guidance of possible location estimates. If so, the user draws a line on touchscreen 309 into the presented floor plan to specify a corresponding path section at the site, along which a movement can be expected to take place in a certain area. For instance, when passing from one space to another, the passage can be expected to take place through a provided connection, like a door. Each path section may be specified for instance by means of a drawn straight line or a drawn sequence of straight lines. Mobile survey device 300 may only enable the input of straight lines. Alternatively, mobile survey device 300 may convert a drawn line into a straight line or a sequence of straight lines for facilitating the definition of a specified path section.

Figure 5:
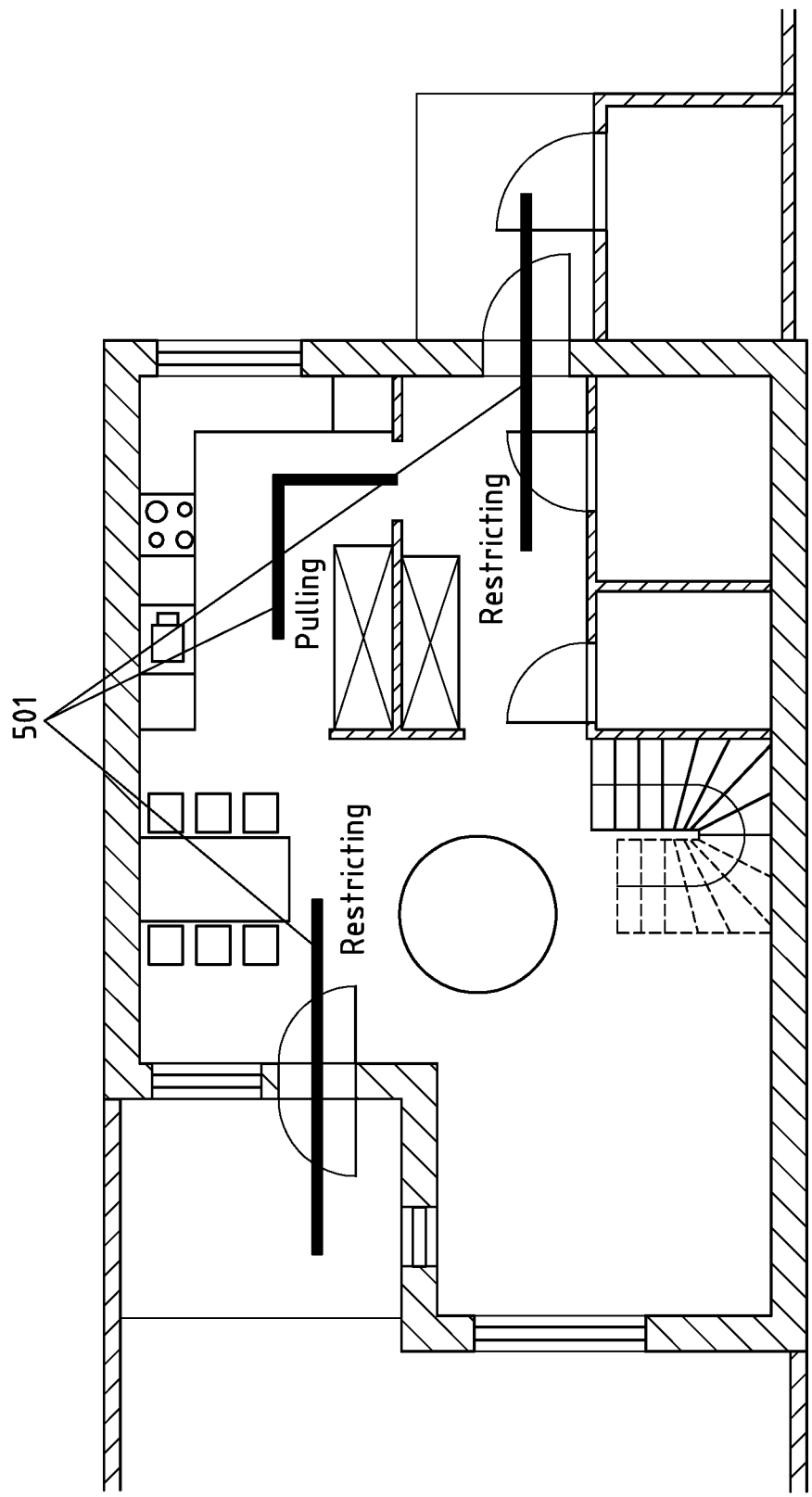
FIG. 5 is a diagram illustrating part of the method of the flow chart of FIG. 4.

For illustration, FIG. 5 presents a floor plan of a house with two entrances. Bold lines 501 indicate lines or a sequence of lines drawn by a user into the floor plan on touchscreen 309. Two single bold lines run through the entrance doors and specify corresponding preferred path sections at the site. Another preferred path section specified by a drawn single line (not shown) could run for instance along a long narrow corridor. A sequence of lines may be drawn by the user for instance in case the preferred path section turns around a corner. This is illustrated in FIG. 5 by the L-shaped sequence of two bold lines. Another preferred path section that may be specified by a sequence of lines (not shown) could be for example the way up- or down a staircase.

Mobile survey device 300 detects a user input drawing lines on touchscreen 309 to specify path sections. (action 405)

In addition, mobile survey device 300 may provide the option to the user to further specify the specified path sections. For instance, once a line specifying a path section has been drawn, double tapping onto the line may result in a presentation of available, selectable options, including a deletion of the specified path section.

For instance, a user may be enabled to further specify a path section by indicating a directionality. This may be of interest for instance in case a door is an entrance-only or exit-only door. Mobile survey device 300 may detect a corresponding user input. (action 406)

For instance, a user may be enabled to further specify a path section by specifying a type of the path section. Two or more types may be defined, for instance a restricting type, a pulling type and a guiding type. A restricting type may require a location estimate for instance to snap to a close surrounding of the specified path section. A pulling type may gently pull the estimate towards the specified path section. This type may also be referred to as gravitating type. A guiding type may take account of a sequence of location estimates for deciding on an adjustment. A default type may be assigned to each specified path section, which may be changed by a user if desired. Mobile survey device 300 may detect a corresponding user input. (action 407)

In the example of FIG. 5, a restricting type ("Restricting") may be assigned for instance to the two path sections specified by lines passing through a respective door depicted in the floor plan, as the doors enable only small variations in movement from one space to the other. A pulling type ("Pulling") may be assigned for instance to the path section specified by the L-shaped line in the floor plan, and guide through a wide corridor.

Furthermore, a user may be enabled to further specify a path section for instance by defining one or more areas associated with each specified path section. (action 408) For example, an influence area may be determined automatically for each specified path section using predefined rules. If another size or shape is considered more appropriate by the user considering the situation on site, he may adjust the automatically determined influence area. It may be ensured that influence areas are generally not overlapping and that a user definition of overlapping influence areas is not accepted. For example, a target area may be determined automatically for each specified path section of restricting type using predefined rules, such that the target area lies within the influence area and encompasses the path section. If another size or shape is considered more appropriate by the user considering the situation on site, he may adjust the automatically determined target area. Alternatively, it may be provided that the user defines the influence area and/or the target area in any case and that no automatic determination is provided. An area defined by a user may be rectangular or of any other shape.

Mobile survey device 300 stores definitions of the specified path sections in memory 304. (action 409) For determining a definition of a specified path section, mobile survey device 300 may, for example, map a line drawn in the floor plan on touchscreen 309 to a corresponding geographic section at the localization site and define this geographic section by coordinates, like longitude and latitude values or easting and northing coordinates. An indication of the coordinates for each path section may then be supplemented with the selected type and directionality, if any, to obtain the final definition of a specified path section.

The fingerprints of various scans stored in memory 304 and the definitions of path sections stored in memory 304 are transmitted to server 310. (action 410) This transmission may take place for instance when the survey of the building or of a floor of the building has been completed.

Server 310 receives the fingerprints and associated definitions of path sections from mobile survey device 300 for the localization site. (action 411) Optionally, it may receive further fingerprints for the same localization site from a plurality of other mobile devices.

Server 310 uses the fingerprints collected at the localization site for generating a grid based radio map as an example representation of the radio environment of the site. (action 412)

A virtual grid is defined to cover the localization site such that each grid point corresponds to a geographical location at the site. If the localization site comprises several floors, a separate grid may be defined for each floor, or a single three dimensional grid may be defined with one dimension for the different floors.

A radio map may be generated by mapping the RSS value(s) and the associated beacon ID(s) of each fingerprint to the grid point that corresponds to a geographical location that is closest to the measurement location indicated in the fingerprint. If there are several RSS values for the same beacon that would be mapped to the same grid point, some kind of average value may be used, for instance the arithmetic mean or the median value. For grid points to which no RSS values could be mapped due to missing fingerprints from the corresponding areas at the localization site, RSS values may be generated by interpolating surrounding RSS values if possible, and by extrapolating neighboring RSS values otherwise. Alternatively, the original or mapped RSS values could be used for estimating for each beacon parameter values for a path loss model, and the pass loss model could then be used for mapping all or missing RSS values to grid points of the grid.

Server 310 stores the radio map data for the site and the associated definitions of path sections in memory 314. The definitions of path sections may be stored as separate information, but in some embodiments, they could also be stored as an integral part of the radio map data. To this end, the path sections and related information could also be mapped to corresponding grid points of the grid. If stored separately, the definition of the path sections as such may be stored for instance in vector form. This may have the effect that the definition can be more accurate and yet be compact. The radio map data may be further processed before storage, for example compressed. The stored data is provided as positioning assistance data enabling determination and adjustment of location estimates. (action 413) It may be provided either for transmission to a requesting device or for positioning computations that are to be performed by serer 310. The requesting device may be a mobile device, of which the location is to be estimated, or another device.

An example use of the positioning assistance data will be described in more detail further below with reference to FIGS. 7 to 11.

In a variation of the operations illustrated in FIG. 4, the path sections could also be specified by a user in advance before starting to collect the fingerprints. In another variation, the path sections could also be specified by a user any time after the fingerprints have been collected and used for generating a radio map. It may be noted that in both cases, the user device does not necessarily have be configured to assemble fingerprints; it does not even have to be a mobile device. Using a mobile device may have the effect, though, that a user is enabled to evaluate the map in view of the actual structural situation at the localization site, which may help in defining path sections.

Figure 6:
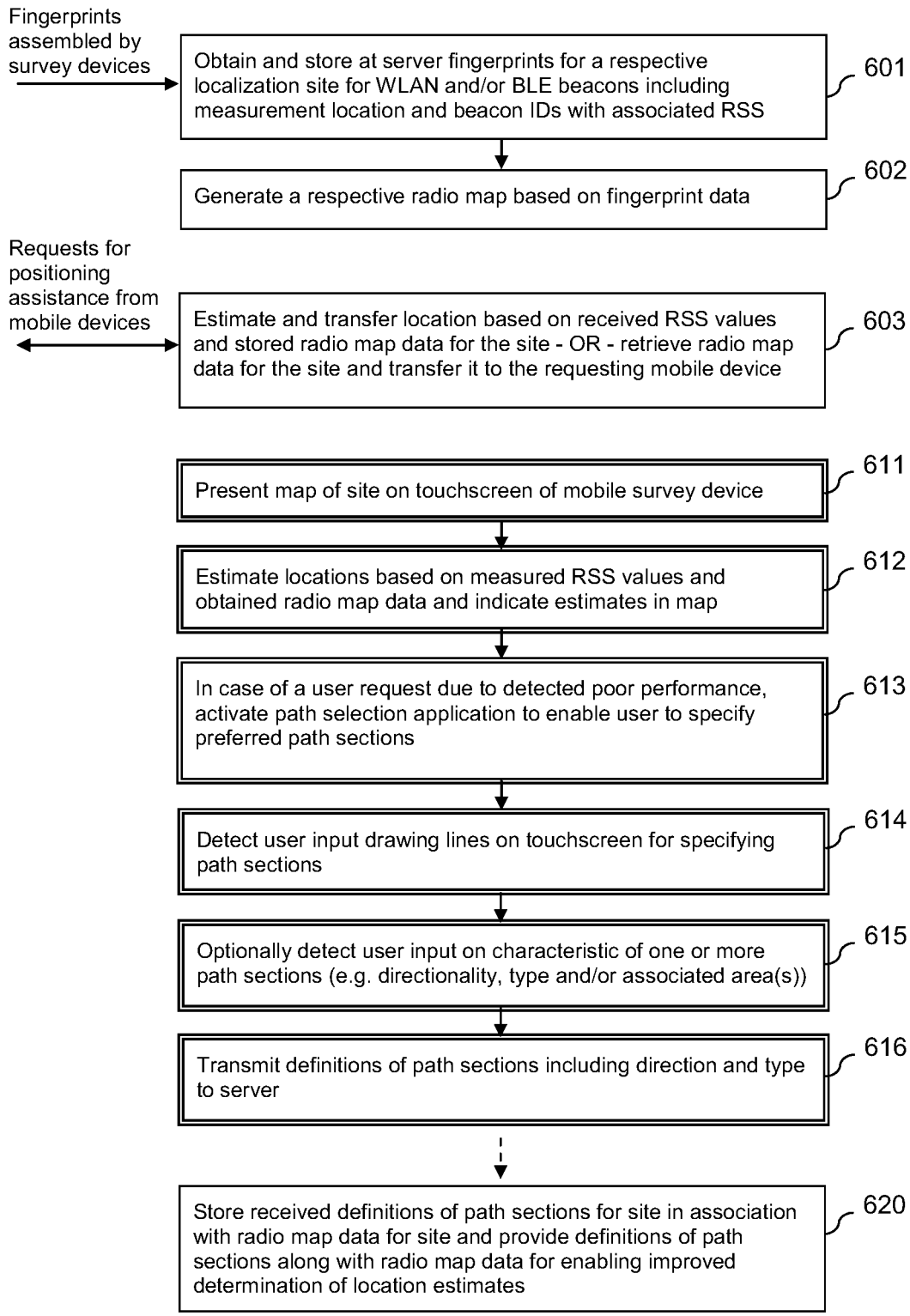
FIG. 6 is a flow chart illustrating a second example embodiment of a method in the system of FIG. 3.

FIG. 6 is a flow chart illustrating example alternative operations of mobile survey device 300 and server 310 in the system of FIG. 3, in which path sections are specified later on. Processor 301 and some of the program code stored in memory 302 may cause mobile survey device 300 to perform the actions presented with double lines when the program code is retrieved from memory 302 and executed by processor 301. Processor 311 and some of the program code stored in memory 312 may cause server 310 to perform the actions presented with single lines when the program code is retrieved from memory 312 and executed by processor 311. The purpose of the operations of FIG. 6 is equally to generate enhanced positioning assistance data for a localization site.

In a training stage, server 310 obtains and stores fingerprints for a respective localization site from a plurality of mobile survey devices. These devices may or may not include survey device 300. Each fingerprint may comprise again an indication of a measurement location together with beacon IDs and associated RSS values. The beacons 330 may comprise again WLAN access points and/or BLE beacons. (action 601)

Server 310 generates a radio map based on the stored fingerprint data for a respective localization site, for instance as described with reference to action 412 of FIG. 4. (action 602) The radio map data may be stored in memory 314.

In a positioning stage, server 310 may then receive requests for positioning assistance from mobile devices 320 that have to know their own position. A request may be a request for positioning assistance data for a particular localization site. This enables the mobile device 320 to determine its own position any time while located at the localization site and without the need for further communication with server 310. Alternatively, a request may be a request for a location estimate. In this case, the request may include in addition the result of radio measurements at the current location of mobile device 320. This result of radio measurements includes at least one RSS value and an associated beacon ID. This approach limits the required storage space and the processing load at mobile device 320.

When receiving a request for positioning assistance data, server 310 retrieves radio map data stored for the localization site from memory 314 and transfers it to the requesting mobile device 320. When receiving a request for a location estimate, server 310 retrieves radio map data stored for the localization site from memory 314, estimates the location of mobile device 320 based on received measurement data and the radio map data, and transfers the location estimate to mobile device 320. (action 603)

At some point in time, the performance of the positioning at a particular localization site may be checked.

To this end, a user of mobile survey device 300 enters the localization site. Thereupon, mobile survey device 300 presents a map of the site, for instance in the form of a floor plan of the floor on which the user is currently located, on touchscreen 309. (action 611) Optionally, the site and/or the floor are identified to this end based on a user input. Alternatively, relevant site and/or floor may be inferred based on a position computed by GNSS receiver 308.

Mobile survey device 300 is then used as one of the mobile devices which request and receive positioning assistance data in the form of radio map data from server 310, as described with reference to action 603. Like other mobile devices, which need to know their own position, mobile survey device 300 scans the environment for radio signals while moving around, and determines RSS values of detected radio signals and the IDs of the beacons that transmitted the radio signals. Mobile survey device 300 estimates its locations based on the RSS values and the obtained radio map data and indicates the location estimates to the user in the map that is presented via touchscreen 309. (action 612)

While the user moves around at the localization site, he/she may monitor whether the sequence of location estimates are shown to move through walls or to cut corners. If so, the user may activate a path selection application, to be able to improve the performance for other users.

Mobile survey device 300 activates in this case a path selection application, in order to enable the user to specify preferred path sections at the localization site. (action 613)

Mobile survey device 300 detects a user input drawing lines on the touchscreen 309 for specifying path sections at corresponding locations at the localization site. (action 614)

Mobile survey device 300 may also detect additional user input further specifying one or more of the specified path sections, for instance by selecting a type of a path section and/or by indicating a directionality of the path section and/or by defining at least one area associated with a path section. (action 615)

When the user has completed the definitions of path sections for a particular floor of the site, he/she may continue with action 611 for the next floor.

Mobile survey device 300 transmits definitions of all path sections specified for all floors of the site, including possibly indicated direction and type, to server 310. (action 616)

Server 310 receives and stores the definitions of the specified path sections for the site in association with the stored radio map data for the site in memory 314. From there on, server 310 may provide the definitions of the path sections for a site along with radio map data for the site in action 603 (either for transmission or for internal computations), in order to enable an improved determination of location estimates. (action 620)

Figure 7:
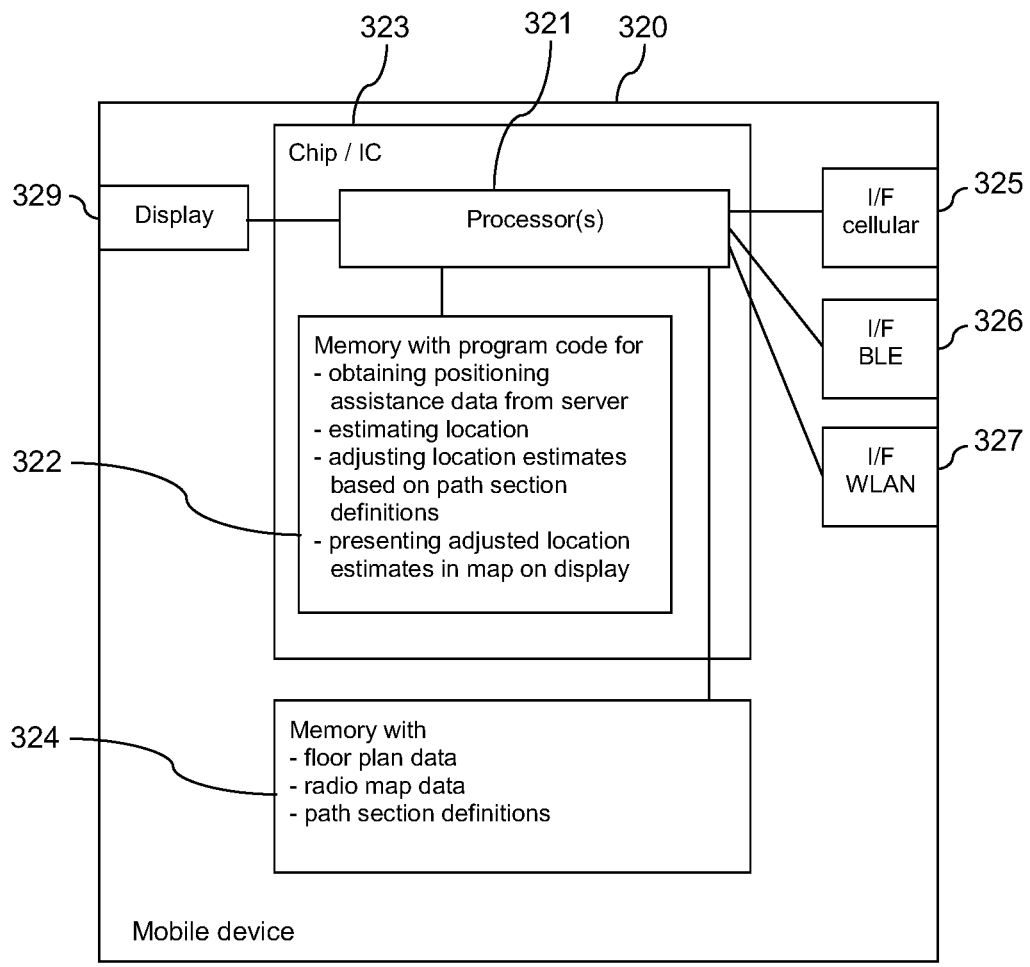
FIG. 7 is a schematic block diagram of an example embodiment of a device of the system of FIG. 3.

FIG. 7 is a schematic block diagram of an example embodiment of a mobile device 320 in the system of FIG. 3. Mobile device enables a determination of location estimates that may be suited to result in an improved user experience when the location estimates are presented in a map on a display.

Mobile device 320 comprises a processor 321 that is linked to a first memory 322, to a second memory 324, and to an interface 325 for cellular communication, to an interface 326 for receiving signals from beacons 330, and to a user interface including a display 329.

Processor 321 is configured to execute computer program code, including computer program code stored in memory 322, in order to cause mobile device 320 to perform desired actions. It is to be understood that processor 321 may comprise or have access to a working memory for this purpose, for example in the form of a random access memory (not shown).

Memory 322 stores computer program code for requesting and obtaining positioning assistance data from server 310, computer program code for determining a location estimate, computer program code for adjusting the location estimates based on path section definitions included in the positioning assistance data, and computer program code for presenting the adjusted location estimates in a map on display 329. Some of the program code in memory 322 may be similar to some of the program code in memory 102. In addition, memory 322 may store computer program code configured to realize other functions. Memory 322 may also store for instance an operating system for mobile survey device 320. In addition, memory 322 may store any kind of data.

Processor 321 and memory 322 may optionally belong to a module 323, like a chip or an integrated circuit or any other kind of processing circuitry, which may comprise in addition various other components, for instance a further processor or a further memory.

Memory 324 is configured to store data, including for example data of floor plans for one or more sites, radio map data for one or more sites, and definitions of path sections for one or more sites. In addition, memory 324 may also store any kind of data.

Interface 325 is configured to enable a communication with other devices via a cellular communication network 340 and further, for example, via the Internet 350. It may be or belong to a cellular engine.

Interface 326 is configured to receive signals from one or more kinds of beacons 330, for instance BLE beacons and/or WLAN access points.

It is to be understood that in addition to display 329, the user interface of mobile device 320 may comprise other input and/or output means, like buttons, keys, a microphone, a loudspeaker, etc.

Mobile device 320 may comprise further components not shown.

Figure 8:
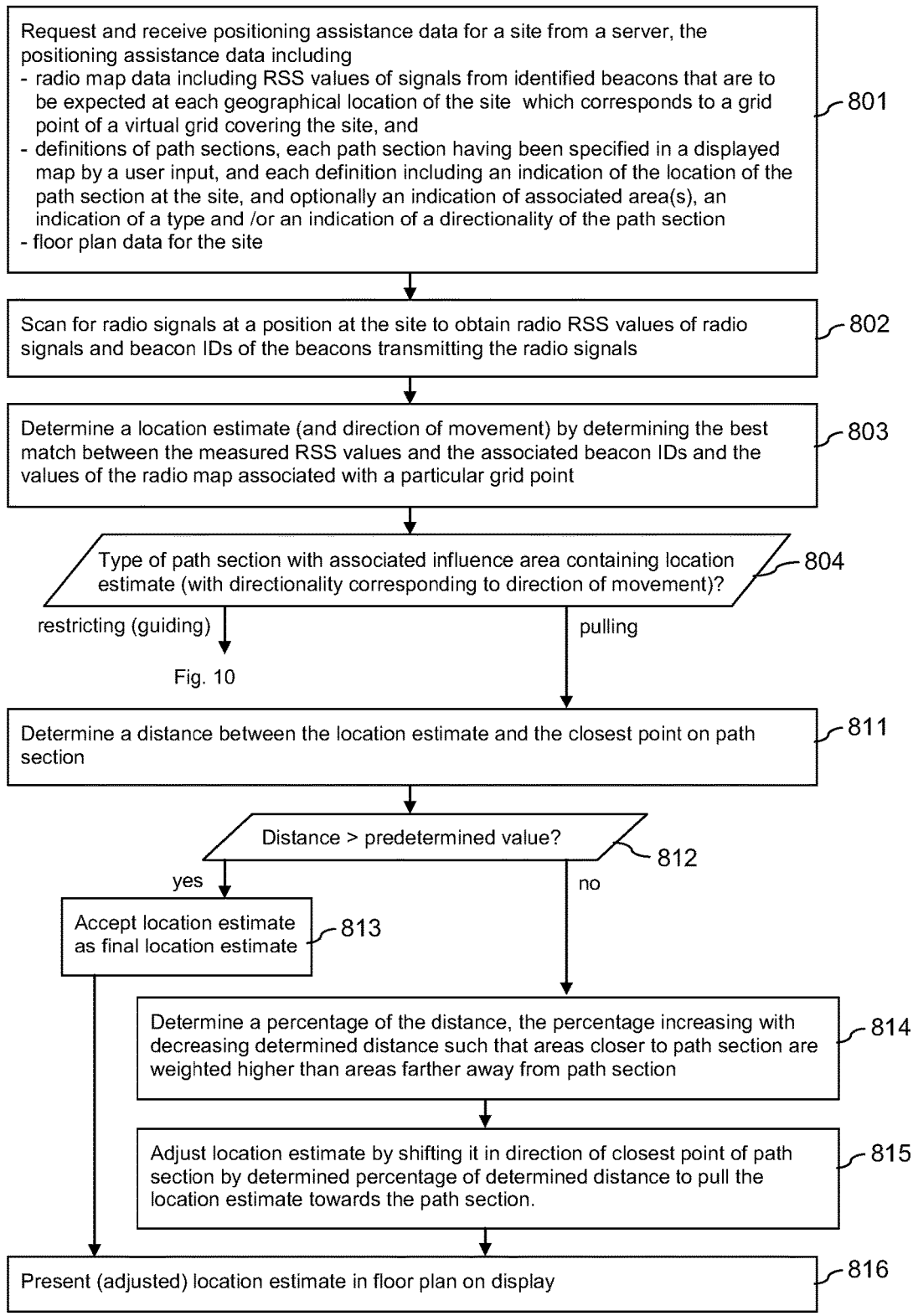
FIG. 8 is a flow chart illustrating an example embodiment of a first part of a method performed by the device of FIG. 7.
Figure 10:
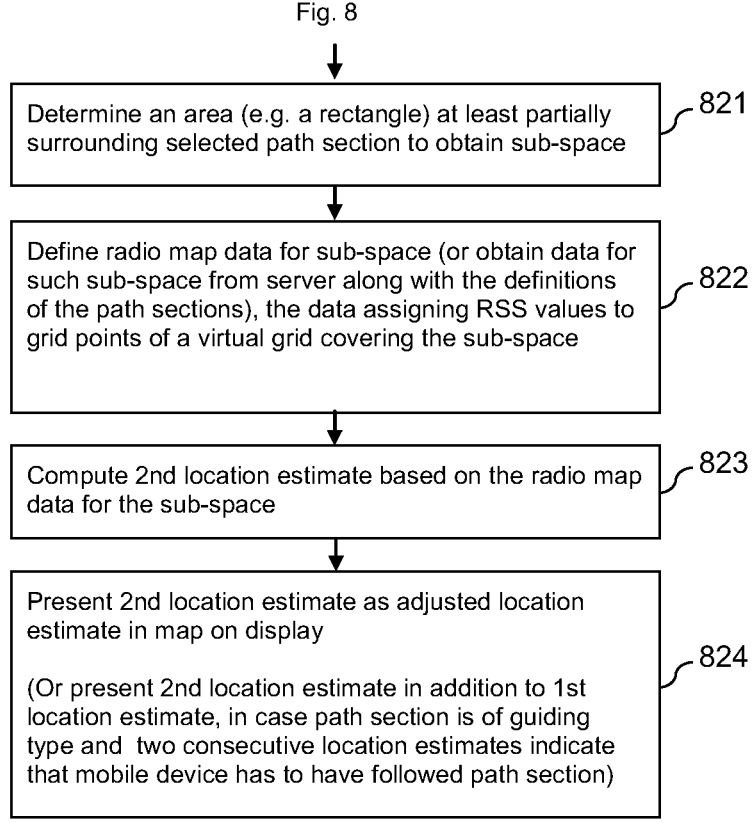
FIG. 10 is a flow chart illustrating an example embodiment of a second part of a method performed by the device of FIG. 7.

FIGS. 8 and 10, in combination, represent a flow chart illustrating example operations of mobile device 320 in the system of FIG. 3. Processor 321 and some of the program code stored in memory 322 may cause mobile device 320 to perform the actions when the program code is retrieved from memory 322 and executed by processor 321. The purpose of the operations of FIGS. 8 and 10 is to determine and present enhanced location estimates at a localization site.

When some application of mobile device 320 needs to know the position of mobile device 320 at a particular localization site, mobile device 320 may request and receive positioning assistance data for the site from server 310 and store the data in memory 324. (action 801) The positioning assistance data may be provided by server 310 for example in the scope of action 413 of FIG. 4 or action 620 of FIG. 6. The positioning assistance data includes radio map data. The radio map data indicates RSS values of signals from identified beacons that are expected to be observed at each geographical location of the site, which corresponds to a grid point of a virtual grid covering the site. The positioning assistance data includes in addition definitions of path sections. A definition of a path section is based on an input of a person specifying the path section in a map that was presented on a display of a mobile survey device 300 or some other device, for example as described with reference to FIG. 4 or FIG. 6. The definition of a path section includes an indication of the location of the path section at the site, and optionally an indication of an influence area associated with the path section, and indication of a target area associated with the path section, an indication of a type of the path section and/or an indication of a directionality of the path section. The positioning assistance data received by mobile device 320 may also include data of floor plans for the site. The positioning assistance data may be stored by mobile device 320 in memory 324.

In addition, mobile device 320 regularly scans for radio signals while moving around. It measures RSS values of detected radio signals and detects the beacon IDs of the beacons 330 transmitting the detected radio signals at a respective position. (action 802)

Mobile device 320 may regularly estimate its location based on this data and the received radio map data for the localization site. For each set of RSS values and associated beacon IDs determined at a particular point in time, a grid point is determined that provides the best match with respect to mapped RSS values and associated beacon IDs in the radio map data. The best match may be determined for instance as the match that results in the minimum total difference (determined e.g. as the sum of absolute values or as Euclidian distance) between the RSS values measured for the beacons and the RRS values for these beacons mapped to the grid point of the grid of the radio map. (action 803) In case more than one location estimate is determined while mobile device 320 moves along, also a direction of movement may be determined based on subsequent location estimates.

The determined location estimate may include an indication of the floor on which the user of mobile device 320 is currently located. This may be achieved by matching detected RSS values with RSS values mapped to grid points of grids for each floor. A corresponding floor plan may be presented on display 329 by the application of mobile device 320 which requires the location of mobile device 320.

In case an influence area has been associated with each specified path section, mobile device 320 may select a path section, with which an influence area is associated that contains the location estimate, if any, If a direction of movement of mobile device 320 is determined in action 803, the path section may only be select in this case, if it has either no directionality assigned or a directionality that essentially corresponds to the determined direction of movement of mobile device 320. In case no influence area has been associated with each specified path section, mobile device 320 may select instead the closest specified path section to a respective location estimate based on the received definitions of path sections and the location estimate. In case a direction of movement of mobile device 320 is determined in action 803, mobile device 320 may select in this case more specifically the closest path section that has either no directionality assigned or a directionality that essentially corresponds to the determined direction of movement of mobile device 320. For the selected path section, mobile device 320 may determine in addition the assigned type, which may be restricting or pulling. (action 804) In addition, or as an alternative to the restricting type, also a guiding type assigned to a selected path section may be supported.

In some cases, no suitable path section may be determined. In this case, the location estimate may be considered to constitute the final location estimate, and the operation may jump to action 816.

The operation for the case that the type is determined to be "restricting" will be described further below with reference to FIG. 10. This operation may also be the basis for the case that the type is determined to be "guiding"; this variation will be described further below with reference to FIG. 12.

If the type is determined to be "pulling", mobile device 320 determines a distance between the location estimate and the closest point on the path section. (action 811)

If the distance exceeds a predetermined value (action 812), the location estimate is accepted as the final location estimate (action 813). Actions 812 and 813 may have the effect of saving processing load for original location estimates that are far from any specified path section anyhow. In some embodiments, these actions may also be omitted.

Figure 9:
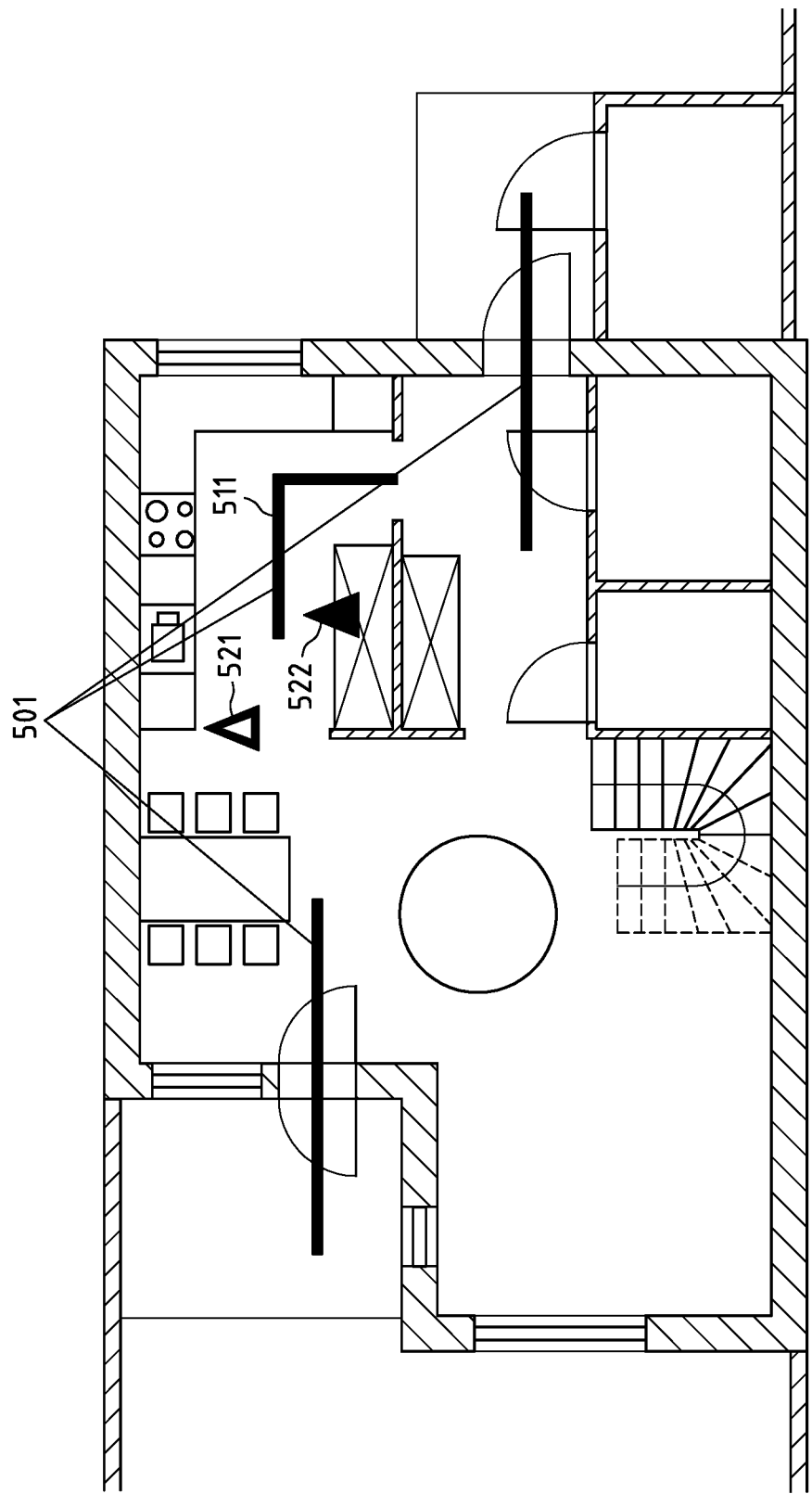
FIG. 9 is a diagram illustrating part of the method of the flow chart of FIG. 8.

FIG. 9 is a diagram of an example floor plan, which corresponds to the floor plan of FIG. 5 and in which path sections have been specified by means of drawn lines 501. Two triangles 521, 522 represent possible location estimates. A triangle 521 with bold lines may represent for instance a location estimate, for which the closest specified path section is represented by the L-shaped lines 511. This path section is of the pulling type. In this example, the distance of the location estimate (represented by triangle 521) to the closest point of the specified path section (represented by lines 511) determined in action 811 may be determined in action 812 to exceed the predetermined value, so that the location estimate is accepted in action 813 as the final location estimate.

The location estimate is presented in the floor plan on display 329. (action 816)

If the distance does not exceed a predetermined value (action 812), the location estimate is adjusted.

In the example of FIG. 9, a filled triangle 522 may represent for instance a location estimate, for which the closest path section is represented by the L-shaped lines 511 again. As indicated before, this path section of the pulling type. The distance of the location estimate (represented by triangle 522) to the closest point of the path section (represented by lines 511) determined in action 811 may be determined in action 812 not to exceed the predetermined value, so that the location estimate is adjusted.

For adjusting a location estimate, at first a percentage of the determined distance may be computed that is the higher the lower the determined distance. Thus, areas closer to the path section are weighted higher than areas farther away from the path section. (action 814)

Then, the location estimate is adjusted by shifting it in direction of the closest point of the path section by the determined percentage of the determined distance. The location estimate is thus pulled towards the path section. (action 815) The adjusted location estimate may be much closer to the path section than the original location estimate.

The adjusted location estimate is presented in the floor plan on display 329. (action 816)

The flow chart of FIG. 10 presents further operations for the case it is determined in action 804 that the type of the closest path section with matching directionality to a location estimate is of restricting type.

Figure 11:
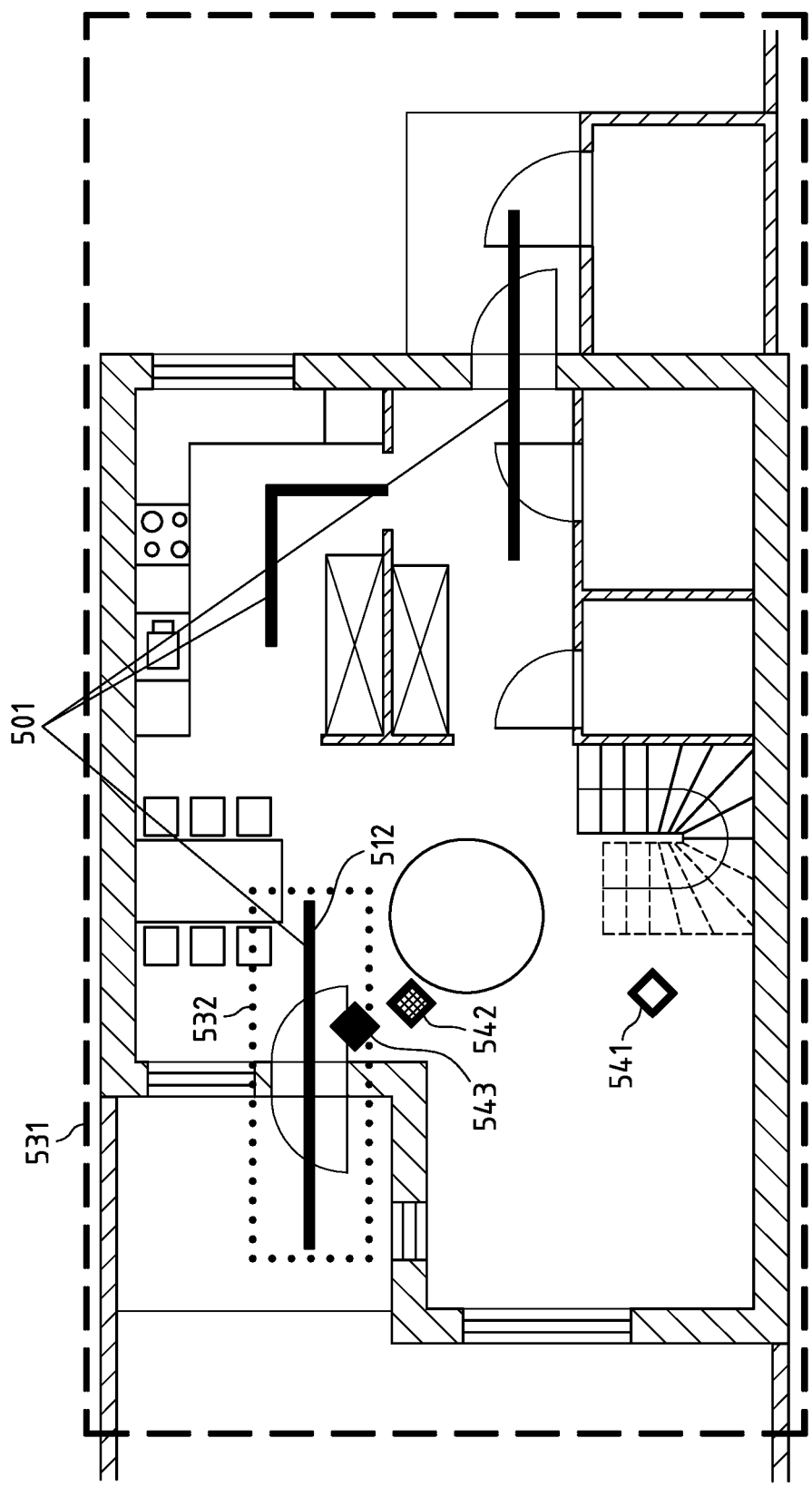
FIG. 11 is a diagram illustrating part of the method of the flow chart of FIG. 10.

FIG. 11 is a diagram of an example floor plan, which corresponds again to the floor plan of FIG. 5 and in which path sections have been specified by means of drawn lines 501. The entire area for which radio map data is available is indicated by a rectangle 531 with bold dashed lines. Two diamonds—one with white filling 541 and one with hashed filling 542—represent possible location estimates. The selected path section for each of these location estimates is the path section represented by line 512. This path section is a path section of the restricting type.

Mobile device 320 determines an area at least partially surrounding the selected path section represented by line 512 as a sub-space. (action 821) This sub-space may correspond to a target area defined in action 408 of FIG. 4 and obtained in action 801, or it may be computed based on predefined rules based on the selected path section.

Such an area is represented in FIG. 11 for the selected path section. The area may be limited for example by a rectangle—represented with bold dotted lines 523—that has a length corresponding to the length of the path section and a widths that provides a predetermined distance to the path section on either side.

Mobile device 320 defines radio map data for the sub-space around the selected path section. Alternatively, separate radio map data may be received from server 310 for each path section of restricting type along with the definitions of the path sections. The radio map data for the sub-space assigns RSS values and associated beacon IDs to grid points of a virtual grid covering the sub-space. This may be achieved in various ways. For instance, simply the RSS values may be used that are assigned to the same grid points in the grid for the entire space. Alternatively, the RSS values that are mapped to the grid points of the virtual grid covering the sub-space may be determined based only on those fingerprints that have been received at server 310 for the area of the sub-space. (action 822)

Mobile device 320 already computed a first location estimate based on the radio map data for the complete localization site in action 803. Now, mobile device 320 computes in addition a second location estimate based on the radio map data for the determined sub-section. (action 823)

The second location estimate may then be presented as adjusted location estimate in the map on display 329. (action 824)

In FIG. 11, diamond 541 represents a possible first location estimate that may have been determined in action 804 to lie outside of the influence area associated with any specified path section 501. Such a location estimate may be considered a final location estimate that is not to be adjusted.

In FIG. 11, diamond 542 represents another possible first location estimate that is determined in action 804 to lie within an influence area associated with path section 512. This may also be interpreted such that the first location estimate represented in FIG. 11 by diamond 542 lies within a predetermined distance to path section 512 or to target area 532.

In FIG. 11, an example second location estimate, computed in action 823 based on radio map data for the determined sub-section 532, is represented by a filled black diamond 543.

The first location estimate represented in FIG. 11 by diamond 542 is adjusted by being replaced by the newly computed second location estimate represented in FIG. 11 by diamond 543 for the presentation in action 824.

FIG. 12 is a diagram illustrating two different variations of the operations presented so far. FIG. 12 depicts parts of the walls 550 from the floor plan of FIG. 5, including the door on the left hand side.

In a first variation, a user of survey device 300 specifies again a path section of restricting type passing through the door, for instance in line with actions 405 through 407 of FIG. 4. The path section is represented in FIG. 12 with a bold line again. However, in a variation of action 408 of FIG. 4, instead of a single target area, the user of survey device 300 defines two adjacent target areas, represented by dotted lines 552a and dashed lines 552b, for the path section. Target area 552a encompasses a portion of the path section represented by a first part 551a of the bold line on the left side of the door, and target area 552b encompasses a portion of the path section represented by a second part 551b of the bold line on the right side of the door. Similarly, instead of a single influence area, the user of survey device 300 defines two adjacent influence areas, represented by dotted lines 553a and dashed lines 553b, for the path section. Influence area 553a contains target area 552a and influence area 553b contains target area 552b. As can be seen by way of example with area 553b, the areas do not have to be rectangular. In the present case, influence areas 553a and 553b have been designed to cover walls close to the door on opposite sides. Alternatively or as a basis, all of the areas could also be defined automatically based on the user definition of path section 551a, 551b.

Now, whenever a location estimate, which may be determined by mobile device 320 similarly as in action 803 of FIG. 8, lies within influence area 553a, it is adjusted to lie in target area 552a. In the same way, whenever a location estimate, determined by mobile device 320 similarly as in action 803 of FIG. 8, lies within influence area 553b, it is adjusted to lie in target area 552b. In both cases, the adjustment may be achieved for example using the same approach as presented for a single path section with reference to FIG. 10. The alternative approach using two influence and target areas for a single path section may ensure that whenever estimated locations move in the neighborhood of the door, this neighborhood represented by the union of influence areas 553a and 553b, e.g. from inside (area 553b) to outside (area 553a), the adjusted location estimates will not be shown to cross the walls when presented in a map on a display, since they only can move from area 552b to area 552a and vice versa.

It is to be understood that similarly, two or more influence areas may be defined for different parts of a single path section of the pulling type.

It is further to be understood that alternatively and equivalently, two or more separate path sections could be defined by the user of survey device 300 in the first place for any passage. In this case, the operation may be the same as described with reference to FIGS. 4, 6, 8 and 10.

FIG. 12 furthermore serves for illustrating the use of a path section of a guiding type.

At the site, mobile device 320 is not able to move from an area represented in FIG. 12 by area 553a to an area represented in FIG. 12 by area 553b or 552b without first going through an area represented in FIG. 12 by area 552a, since otherwise walls represented in FIG. 12 by walls 550 are in the way.

This may be reflected in an example embodiment by an adjustment of location estimates that is based on a sequence of at least two location estimates. For example, if a first location estimate is in the area 553a, and consecutive location estimate is in the area 553b, then two intermediate location estimates, one in area 552a and one in area 552b, may be added so that the location estimate that is presented moves from area 553a to area 552a and then to area 552b and finally to area 553b, which may guarantee that walls are shown to be not crossed. In this case, the adjustment of a location estimate may thus comprise an adding of a location estimate.

The guiding type path section can be considered as a special case of a restricting type path section, which is indicated in action 824 of FIG. 10. A location estimate in a respective influence area can be adjusted to lie in a respective target area, for example similarly as described with reference to FIG. 10, to obtain a respective intermediate location estimate. The main difference may be seen in that a location estimate is adjusted to lie within the target area only when there is an indication derived from the sequence of location estimates that mobile terminal 320 has gone through a specified path section, e.g. in the case of specified path section 551a, 551b, when two consecutive location estimates are determined to lie inside area 553a and area 553b respectively.

It is to be understood that the presented example systems, apparatuses and operations may be further varied in many ways. The systems and apparatuses may be varied for instance by modifying, adding or omitting components. The operations may be varied for instance by modifying actions, by omitting actions and/or by adding actions. In addition, the order of actions may be modified.

For example, in an alternative embodiment, the beacons may include for example other transmitters than BLE beacons or WLAN access points, for example regular Bluetooth transmitters or ultra-sound transmitters, etc.

For example, in an alternative embodiment, the location of measurement may be determined by mobile survey devices by other means than user input or GNSS based positioning, for instance using a WLAN based positioning.

For example, in an alternative embodiment, a separate grid may be defined for each detected beacon of a site, instead of using a grid, in which RSS values of several beacons may be mapped to a grid point, as described with reference to action 412.

For example, in an alternative embodiment, a location estimate may also be determined by calculating likelihood values by matching the RSS values of at least one beacon with the expected RSS values for the at least one beacon mapped to grid points of the radio map. Once the likelihood for different locations has been calculated, the location of a mobile device may be estimated, for example, as the location for which the likelihood achieves the maximum value.

For example, in an alternative embodiment, a set of radio models, for example path loss models, may be determined in action 412 of FIG. 4 or action 602 of FIG. 6 as a representation of a radio environment instead of a radio map. In case a representation of a radio environment comprises parameter values of parametric radio models for each detected beacon, a location may be estimated by defining circles around beacon positions defined by the parameter values, the radius of each circle being computed using the radio model for the respective beacon and the received signal strength value measured for the respective beacon. The location may then be estimated to correspond to an intersection point of all circles.

For example, in an alternative embodiment, a stationary device may perform actions 611 to 616 of FIG. 6 instead of mobile survey device 300. Such a device does not have to comprise interface 305, interface 306 or GNSS receiver 308. Instead, it may have a wired connection to the Internet 350 in order to be able communication with server 300.

For example, in an alternative embodiment, actions 803-815 and actions 821-823 of FIGS. 8 and 10 could also be performed by server 310. In this case, mobile device 320 only assembles measured RSS values of detected beacon signals and the beacon IDs of the beacons 330 transmitting the detected beacon signals as a radio sample and transmits the radio sample in a message to server 300 along with a positioning request. The final location estimate may then be transmitted by server 310 to mobile device 320, which presents the location estimate in a map on display 329.

Summarized, certain embodiments of the invention may provide for reference paths of location estimates at key locations. This may improve the perceived end-user experience at transitions between spaces.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

A bus may be provided for connecting processor(s) and memories.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

In example embodiments, any non-transitory computer readable medium mentioned in this text could also be a removable/portable storage or a part of a removable/portable storage instead of an integrated storage. Example embodiments of such a removable storage comprise a magnetic disc storage, of an optical disc storage, a semiconductor memory circuit device storage and of a Micro-SD semiconductor memory card storage.

The functions illustrated by processor(s) 101 in combination with memory(-ies) 102, or processor 321 in combination with memory 322, or component 323 can also be viewed as means for obtaining at least one characteristic of at least one radio signal detected at a mobile device that is located at a particular site; means for obtaining a representation of a radio environment for the site and a definition of at least one specified path section for the site, the at least one path section having been specified by a person in a map presented on a display; means for determining a location estimate for the mobile device based on the at least one characteristic of the at least one radio signal and based on the representation of the radio environment for the site; and means for adjusting the determined location estimate based on the definition of at least one specified path section.

The program codes in memory 102 or memory 322 can also be viewed as comprising such means in the form of functional modules.

FIGS. 2, 4, 6, 8 and 10 may also be understood to represent example functional blocks of computer program code improving a user experience with location estimates.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

What is claimed is:

1. A method performed by at least one device, the method comprising:
    obtaining at least one characteristic of at least one radio signal detected at a mobile device that is located at a particular site, wherein the particular site comprises a plurality of path sections including at least one path section having a restricting path type, at least one path section having a pulling path type, and at least one path section having a guiding path type;
    obtaining a representation of a radio environment for the site and a definition of at least three specified path sections of the plurality of path sections for the site, the at least three path sections having been specified by a person in a map presented on a display, wherein the definition of each of the at least three specified path sections comprises an indication of one of the three types of path sections for the respective specified path section;
    determining a first location estimate for the mobile device based on a first characteristic of a first radio signal and based on the representation of the radio environment for the site;
    determining a second location estimate for the mobile device based on a second characteristic of a second radio signal and based on the representation of the radio environment for the site;
    determining a third location estimate for the mobile device based on a third characteristic of a third radio signal and based on the representation of the radio environment for the site; and
    adjusting the determined first location estimate, the determined second location estimate, and the determined third location estimate based on the definition of at least one specified path section for each determined location estimate, wherein adjusting the respective determined location estimate based on the definition of at least one specified path section for each determined location estimate comprises:
        selecting a first specified path section that is closest to the determined first location estimate or is associated with an influence area in which the determined first location estimate is determined to lie, wherein the first specified path section has a restricting type;
        adjusting the determined first location estimate to lie within a target area associated with the first specified path section;
        selecting a second specified path section that is closest to the determined second location estimate or is associated with an influence area in which the determined second location estimate is determined to lie, wherein the second specified path section has a pulling type;
        adjusting the determined second location estimate more strongly in proportion to proximity of the second specified path section;
        selecting a third specified path section that is closest to the determined third location estimate or is associated with an influence area in which the determined third location estimate is determined to lie, wherein the third specified path section has a guiding type;
        adjusting the determined third location estimate based on an evaluation of a sequence of at least two determined location estimates.

2. The method according to claim 1, further comprising presenting a map of the site on a display and indicating the adjusted determined first location, adjusted determined second location, or adjusted determined third location estimate in the map.

3. The method according to claim 1, further comprising determining a direction of movement of the mobile device based on the first characteristic of the first radio signal; wherein selecting the first specified path section requires the definition of the first specified path section comprising an indication that the first specified path section has no directionality or a directionality corresponding to the determined direction of movement.

4. The method according to claim 1, wherein adjusting the determined first location estimate comprises one of:
    shifting the determined first location estimate, which lies within an influence area associated with the first specified path section to a closest point on the first specified path section; or
    shifting a location estimate, which lies within an influence area associated with the first specified path section, to a closest point in a target area associated with the first specified path section; or
    shifting the determined first location estimate in direction of the first specified path section, wherein a relative distance by which the determined first location estimate is shifted is selected to be the larger the closer the determined first location estimate is to the selected path section; or
    with the first location estimate that is determined based on a representation of a radio environment for the entire site, determining a fourth location estimate based on a representation of a radio environment for a sub-space comprising the first specified path section, and choosing the fourth location estimate as adjusted location estimate in case the first location estimate and the fourth location estimate lie within a predetermined distance to each other; or
    with the first location estimate that is determined based on a representation of a radio environment for the entire site, determining a fourth location estimate based on a representation of a radio environment for a sub-space comprising the first specified path section, and choosing the fourth location estimate as adjusted location estimate in case the first location estimate lies within a predetermined distance to the sub-space; or
    with the first location estimate that is determined based on a representation of a radio environment for the entire site, and in case the first location estimate lies within a predetermined influence area, determining a fourth location estimate based on a representation of a radio environment for a sub-space comprising the first specified path section, and choosing the fourth location estimate as adjusted location estimate; or with the first location estimate that is determined based on a representation of a radio environment for the entire site, determining a distance of the first location estimate to a closest point of the first specified path section, and in the case the distance falls short of a predetermined value, determining a fourth location estimate based on a representation of a radio environment for a sub-space comprising the selected path section, and choosing the fourth location estimate as adjusted location estimate; or with the first location estimate that is determined based on at least one characteristic of the at least one radio signal detected at the mobile device at a first instance of time and a fourth location estimate based on at least one characteristic of the at least one radio signal detected at the mobile device at a second instance of time, and supplementing the first location estimate and the fourth location estimate with intermediate location estimates, the intermediate location estimates being determined such that a route from the first location estimate to the fourth location estimate via the intermediate location estimates passes at least one target area associated with the first specified path section; or with the first location estimate that is determined based on at least one characteristic of the at least one radio signal detected at the mobile device at a first instance of time, determining a fourth location estimate based on at least one characteristic of the at least one radio signal detected at the mobile device at a second instance of time, and supplementing the first location estimate and the fourth location estimate with intermediate location estimates, in case the first location estimate lies in a first influence area associated with the first specified path section and the fourth location estimate lies in a second influence area associated with the first specified path section or with a further selected path section.

5. A system comprising at least one processor and at least one memory, wherein the at least one memory includes computer program code, the at least one memory and the computer program code configured to, with the at least one processor, cause at least one device to at least to:

obtain at least one characteristic of at least one radio signal detected at a mobile device that is located at a particular site, wherein the particular site comprises a plurality of path sections including at least one path section having a restricting path type, at least one path section having a pulling path type, and at least one path section having a guiding path type;

obtain a representation of a radio environment for the site and a definition of at least three specified path sections of the plurality of path sections for the site, the at least three path section having been specified by a person in a map presented on a display, wherein the definition of each of the at least three specified path sections comprises an indication of one of the three types of path sections for the respective specified path section;

determine a first location estimate for the mobile device based on a first characteristic of a first radio signal and based on the representation of the radio environment for the site;

determining a second location estimate for the mobile device based on a second characteristic of a second radio signal and based on the representation of the radio environment for the site;

determining a third location estimate for the mobile device based on a third characteristic of a third radio signal and based on the representation of the radio environment for the site; and adjust the determined first location estimate, the determined second location estimate, and the determined third location estimate based on the definition of at least one specified path section for each determined location estimate, wherein causing the at least one device to adjust the respective determined location estimate based on the definition of at least one specified path section for each determined location estimate comprises causing the at least one device to:

select a first specified path section that is closest to the determined first location estimate or is associated with an influence area in which the determined first location estimate is determined to lie, wherein the first specified path section has a restricting type;

adjust the determined first location estimate to lie within a target area associated with the first specified path section;

select a second specified path section that is closest to the determined second location estimate or is associated with an influence area in which the determined second location estimate is determined to lie, wherein the second specified path section has a pulling type;

adjust the determined second location estimate more strongly in proportion to proximity of the second specified path section;

select a third specified path section that is closest to the determined third location estimate or is associated with an influence area in which the determined third location estimate is determined to lie, wherein the third specified path section has a guiding type;

adjust the determined third location estimate based on an evaluation of a sequence of at least two determined location estimates.

6. The system according to claim 5, wherein the at least one memory and the computer program code are further configured to, with the at least one processor, cause at least one device to present a map of the site on a display and to indicate the adjusted determined first location, adjusted determined second location, or adjusted determined third location estimate in the map.

7. The system according to claim 5, wherein the at least one memory and the computer program code are further configured to, with the at least one processor, cause at least one device to determine a direction of movement of the mobile device based on the first characteristic of the first radio signal, wherein selecting the first specified path section requires the definition of the first specified path section comprising an indication that the first specified path section has no directionality or a directionality corresponding to the determined direction of movement.

8. The system according to claim 5, wherein adjusting the determined first location estimate comprises one of:

shifting the determined first location estimate, which lies within an influence area associated with the first specified path section to a closest point on the first specified path section; or shifting a location estimate, which lies within an influence area associated with the first specified path section, to a closest point in a target area associated with the first specified path section; or shifting the determined first location estimate in direction of the first specified path section, wherein a relative distance by which the determined first location estimate is shifted is selected to be the larger the closer the determined first location estimate is to the selected path section; or with the first location estimate that is determined based on a representation of a radio environment for the entire site, determining a fourth location estimate based on a representation of a radio environment for a sub-space comprising the first specified path section, and choosing the fourth location estimate as adjusted location estimate in case the first location estimate and the fourth location estimate lie within a predetermined distance to each other; or with the first location estimate that is determined based on a representation of a radio environment for the entire site, determining a fourth location estimate based on a representation of a radio environment for a sub-space comprising the first specified path section, and choosing the fourth location estimate as adjusted location estimate in case the first location estimate lies within a predetermined distance to the sub-space; or with the first location estimate that is determined based on a representation of a radio environment for the entire site, and in case the first location estimate lies within a predetermined influence area, determining a fourth location estimate based on a representation of a radio environment for a sub-space comprising the first specified path section, and choosing the fourth location estimate as adjusted location estimate; or with the first location estimate that is determined based on a representation of a radio environment for the entire site, determining a distance of the first location estimate to a closest point of the first specified path section, and in the case the distance falls short of a predetermined value, determining a fourth location estimate based on a representation of a radio environment for a sub-space comprising the selected path section, and choosing the fourth location estimate as adjusted location estimate; or with the first location estimate that is determined based on at least one characteristic of the at least one radio signal detected at the mobile device at a first instance of time and a fourth location estimate based on at least one characteristic of the at least one radio signal detected at the mobile device at a second instance of time, and supplementing the first location estimate and the fourth location estimate with intermediate location estimates, the intermediate location estimates being determined such that a route from the first location estimate to the fourth location estimate via the intermediate location estimates passes at least one target area associated with the first specified path section; or with the first location estimate that is determined based on at least one characteristic of the at least one radio signal detected at the mobile device at a first instance of time, determining a fourth location estimate based on at least one characteristic of the at least one radio signal detected at the mobile device at a second instance of time, and supplementing the first location estimate and the fourth location estimate with intermediate location estimates, in case the first location estimate lies in a first influence area associated with the first specified path section and the fourth location estimate lies in a second influence area associated with the first specified path section or with a further selected path section.

9. A non-transitory computer readable storage medium or a set of non-transitory computer readable storage media, in which computer program code is stored, the computer program code causing at least one device to perform the following when executed by at least one processor:

obtain at least one characteristic of at least one radio signal detected at a mobile device that is located at a particular site, wherein the particular site comprises a plurality of path sections including at least one path section having a restricting path type, at least one path section having a pulling path type, and at least one path section having a guiding path type;

obtain a representation of a radio environment for the site and a definition of at least three specified path sections of the plurality of path sections for the site, the at least three path section having been specified by a person in a map presented on a display, wherein the definition of each of the at least three specified path sections comprises an indication of one of the three types of path sections for the respective specified path section;

determine a first location estimate for the mobile device based on a first characteristic of a first radio signal and based on the representation of the radio environment for the site;

determining a second location estimate for the mobile device based on a second characteristic of a second radio signal and based on the representation of the radio environment for the site;

determining a third location estimate for the mobile device based on a third characteristic of a third radio signal and based on the representation of the radio environment for the site; and adjust the determined first location estimate, the determined second location estimate, and the determined third location estimate based on the definition of at least one specified path section for each determined location estimate, wherein causing the at least one device to adjust the respective determined location estimate based on the definition of at least one specified path section for each determined location estimate comprises causing the at least one device to:

select a first specified path section that is closest to the determined first location estimate or is associated with an influence area in which the determined first location estimate is determined to lie, wherein the first specified path section has a restricting type;

adjust the determined first location estimate to lie within a target area associated with the first specified path section;

select a second specified path section that is closest to the determined second location estimate or is associated with an influence area in which the determined second location estimate is determined to lie, wherein the second specified path section has a pulling type;

adjust the determined second location estimate more strongly in proportion to proximity of the second specified path section;

select a third specified path section that is closest to the determined third location estimate or is associated with an influence area in which the determined third location estimate is determined to lie, wherein the third specified path section has a guiding type;

adjust the determined third location estimate based on an evaluation of a sequence of at least two determined location estimates.

* * * * *